US012593014B2

(12) United States Patent
Vaziri

(10) Patent No.: US 12,593,014 B2
(45) Date of Patent: *Mar. 31, 2026

(54) METHOD AND APPARATUS FOR AN IMAGING DEVICE

(71) Applicant: Optics Innovation LLC, Portland, ME (US)

(72) Inventor: Masoud Vaziri, Richardson, TX (US)

(73) Assignee: Optics Innovation LLC, Portland, ME (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/010,448

(22) Filed: Jan. 6, 2025

(65) Prior Publication Data

US 2025/0142025 A1 May 1, 2025

Related U.S. Application Data

(63) Continuation of application No. 18/363,726, filed on Aug. 1, 2023, which is a continuation of application
(Continued)

(51) Int. Cl.
*H04N 7/18* (2006.01)
*G02C 11/00* (2006.01)
(Continued)

(52) U.S. Cl.
CPC .............. *H04N 7/183* (2013.01); *G02C 11/10* (2013.01); *G06F 1/163* (2013.01); *G06F 3/011* (2013.01);
(Continued)

(58) Field of Classification Search
CPC ...... H04N 7/183; H04N 13/239; H04N 13/25; H04N 13/243; H04N 23/57; H04N 23/55;
(Continued)

(56) References Cited

U.S. PATENT DOCUMENTS 4,028,725 A 6/1977 Lewis
4,907,296 A 3/1990 Blecha
(Continued)

FOREIGN PATENT DOCUMENTS

WO 2011004378 A 1/2011

OTHER PUBLICATIONS

"A High Speed Eye Tracking System with Robust Pupil Center Estimation Algorithm", Proceedings of the 29th Ammal International Conference of the IEEE EMBS, 25 Kyon, France, pp. 3331-3334, Aug. 2007.
(Continued)

*Primary Examiner* — Rowina J Cattungal
(74) *Attorney, Agent, or Firm* — NIXON PEABODY LLP

(57) ABSTRACT

An embodiment of an image recording apparatus includes an eyeglass frame, at least one first optical unit disposed on the eyeglass frame for capturing a main scene image, and at least one second optical unit disposed on the eyeglass frame for capturing an auxiliary scene image. The first and the second field of view of the user at least partially overlap. The image resolution of the main scene image is lower than the image resolution of the main scene image and the field of view of the main scene image is larger than the field of view of the auxiliary scene image. The image recording apparatus further includes at least one processor for receiving the main and the auxiliary scene images, and generating a modified resolution copy of the main scene image based on the auxiliary scene image.

21 Claims, 10 Drawing Sheets

Related U.S. Application Data

No. 16/901,761, filed on Jun. 15, 2020, now Pat. No. 11,716,449, which is a continuation of application No. 15/893,724, filed on Feb. 12, 2018, now Pat. No. 10,687,027, which is a continuation of application No. 14/523,386, filed on Oct. 24, 2014, now Pat. No. 9,894,326, which is a continuation of application No. 12/794,283, filed on Jun. 4, 2010, now Pat. No. 8,872,910.

(60) Provisional application No. 61/184,232, filed on Jun. 4, 2009.

(51) Int. Cl.

| | |
|---|---|
| *G06F 1/16* | (2006.01) |
| *G06F 3/01* | (2006.01) |
| *H04N 13/239* | (2018.01) |
| *H04N 13/243* | (2018.01) |
| *H04N 13/25* | (2018.01) |
| *H04N 23/55* | (2023.01) |
| *H04N 23/57* | (2023.01) |
| *H04N 23/661* | (2023.01) |

(52) U.S. Cl.
CPC ........... *G06F 3/013* (2013.01); *H04N 13/239* (2018.05); *H04N 13/243* (2018.05); *H04N 13/25* (2018.05); *H04N 23/55* (2023.01); *H04N 23/57* (2023.01); *H04N 7/18* (2013.01); *H04N 23/661* (2023.01); *H04N 2213/001* (2013.01)

(58) Field of Classification Search
CPC ......... G02C 11/10; G06F 1/163; G06F 3/011; G06F 3/013
See application file for complete search history.

(56) References Cited

U.S. PATENT DOCUMENTS

| | | | |
|---|---|---|---|
| 5,262,871 A | 11/1993 | Wilder | |
| 5,856,811 A | 1/1999 | Shih | |
| 5,859,921 A | 1/1999 | Suzuki | |
| 6,091,546 A * | 7/2000 | Spitzer | G02B 27/0172 |
| | | | 351/158 |
| 6,163,336 A | 12/2000 | Richards | |
| 6,198,485 B1 | 3/2001 | Mack | |
| 6,285,799 B1 | 9/2001 | Dance | |
| 6,307,526 B1 | 10/2001 | Mann | |
| 6,434,280 B1 | 8/2002 | Peleg | |
| 6,486,799 B1 | 11/2002 | Still | |
| 6,661,495 B1 | 12/2003 | Popovich | |
| 6,766,067 B2 | 7/2004 | Freeman | |
| 6,850,629 B2 | 2/2005 | Jeon | |
| 7,023,464 B1 | 4/2006 | Harada | |
| 7,331,671 B2 | 2/2008 | Hammond | |
| 7,391,887 B2 | 6/2008 | Durnell | |
| 7,492,926 B2 | 2/2009 | Kang | |
| 7,538,326 B2 | 5/2009 | Johnson | |
| 7,697,024 B2 | 4/2010 | Currivan | |
| 7,715,658 B2 | 5/2010 | Cho | |
| 7,894,666 B2 | 2/2011 | Mitarai | |
| 8,014,632 B2 | 9/2011 | Matsumoto | |
| 8,139,089 B2 | 3/2012 | Doyle | |
| 8,159,519 B2 | 4/2012 | Kurtz | |
| 8,189,100 B2 | 5/2012 | Li | |
| 8,305,899 B2 | 11/2012 | Luo | |
| 8,432,492 B2 | 4/2013 | Deigmoeller | |
| 8,666,196 B2 | 3/2014 | Young | |
| 8,872,910 B1 | 10/2014 | Vaziri | |
| 9,230,140 B1 | 1/2016 | Ackley | |
| 9,438,491 B1 | 9/2016 | Van Broeck | |
| 9,438,819 B2 | 9/2016 | Van Broeck | |
| 9,618,746 B2 | 4/2017 | Browne | |
| 9,674,490 B2 | 6/2017 | Koravadi | |
| 9,727,790 B1 | 8/2017 | Vaziri | |
| 9,779,311 B2 | 10/2017 | Lee | |
| 9,858,676 B2 | 1/2018 | Bostick | |
| 9,864,372 B2 | 1/2018 | Chen | |
| 10,039,445 B1 | 8/2018 | Torch | |
| 10,064,552 B1 | 9/2018 | Vaziri | |
| 10,708,514 B2 | 7/2020 | Haltmaier | |
| 11,189,017 B1 | 11/2021 | Bagai | |
| 11,287,262 B2 | 3/2022 | Dooley | |
| 2003/0122930 A1 | 7/2003 | Schofield | |
| 2004/0212882 A1 | 10/2004 | Liang | |
| 2004/0218834 A1 | 11/2004 | Bishop | |
| 2005/0046698 A1 * | 3/2005 | Knight | H04N 23/661 |
| | | | 348/E7.086 |
| 2006/0033992 A1 | 2/2006 | Solomon | |
| 2006/0279585 A1 | 12/2006 | Milanfar | |
| 2007/0041663 A1 | 2/2007 | Cho | |
| 2007/0115349 A1 | 5/2007 | Currivan | |
| 2008/0010060 A1 | 1/2008 | Asano | |
| 2008/0030592 A1 | 2/2008 | Border | |
| 2008/0036875 A1 * | 2/2008 | Jones | H04N 23/63 |
| | | | 348/E7.086 |
| 2008/0198324 A1 | 8/2008 | Fuziak | |
| 2008/0291295 A1 | 11/2008 | Kato | |
| 2008/0297589 A1 | 12/2008 | Kurtz | |
| 2009/0136158 A1 | 5/2009 | Tamura | |
| 2009/0189974 A1 | 7/2009 | Deering | |
| 2009/0210786 A1 | 8/2009 | Suzuki | |
| 2009/0219224 A1 * | 9/2009 | Elg | H04S 7/304 |
| | | | 345/8 |
| 2010/0053555 A1 | 3/2010 | Enriquez | |
| 2010/0103276 A1 | 4/2010 | Border | |
| 2010/0128135 A1 | 5/2010 | Filipovich | |
| 2010/0149073 A1 * | 6/2010 | Chaum | G02B 27/0075 |
| | | | 345/8 |
| 2010/0157078 A1 | 6/2010 | Atanassov | |
| 2010/0157079 A1 | 6/2010 | Atanassov | |
| 2010/0165287 A1 * | 7/2010 | Pienimaa | G02B 27/0172 |
| | | | 351/158 |
| 2010/0208207 A1 | 8/2010 | Connell, II | |
| 2010/0240988 A1 | 9/2010 | Varga | |
| 2010/0254630 A1 | 10/2010 | Ali | |
| 2010/0277619 A1 | 11/2010 | Scarff | |
| 2010/0289941 A1 | 11/2010 | Ito | |
| 2010/0290668 A1 | 11/2010 | Friedman | |
| 2010/0290685 A1 | 11/2010 | Wein | |
| 2011/0064327 A1 * | 3/2011 | Dagher | G06T 5/50 |
| | | | 382/284 |
| 2011/0263946 A1 | 10/2011 | El Kaliouby | |
| 2011/0279666 A1 | 11/2011 | Stromborn | |
| 2012/0086780 A1 | 4/2012 | Sharma | |
| 2012/0257005 A1 | 10/2012 | Browne | |
| 2013/0106911 A1 | 5/2013 | Salsman | |
| 2013/0121525 A1 | 5/2013 | Chen | |
| 2013/0242057 A1 | 9/2013 | Hong | |
| 2014/0146153 A1 | 5/2014 | Birnkrant | |
| 2014/0267890 A1 | 9/2014 | Lelescu | |
| 2014/0313335 A1 | 10/2014 | Koravadi | |
| 2015/0009550 A1 | 1/2015 | Misago | |
| 2015/0209002 A1 | 7/2015 | De Beni | |
| 2016/0012280 A1 | 1/2016 | Ito | |
| 2016/0179093 A1 | 6/2016 | Prokorov | |
| 2016/0225192 A1 | 8/2016 | Jones | |
| 2017/0007351 A1 | 1/2017 | Yu | |
| 2017/0019599 A1 | 1/2017 | Muramatsu | |
| 2017/0099479 A1 | 4/2017 | Browd | |
| 2017/0142312 A1 | 5/2017 | Dal Mutto | |
| 2017/0181802 A1 | 6/2017 | Sachs | |
| 2017/0225336 A1 | 8/2017 | Deyle | |
| 2017/0322410 A1 | 11/2017 | Watson | |
| 2017/0360578 A1 | 12/2017 | Shin | |
| 2018/0012413 A1 | 1/2018 | Jones | |
| 2018/0188892 A1 | 7/2018 | Levac | |
| 2018/0330473 A1 | 11/2018 | Foi | |
| 2019/0175214 A1 | 6/2019 | Wood | |
| 2019/0254754 A1 | 8/2019 | Johnson | |
| 2019/0272336 A1 | 9/2019 | Ciecko | |
| 2020/0041261 A1 | 2/2020 | Bernstein | |

(56)                    References Cited

U.S. PATENT DOCUMENTS

| 2020/0077033 A1 | 3/2020 | Chan |
| 2020/0117025 A1 | 4/2020 | Sauer |
| 2020/0330179 A1 | 10/2020 | Ton |
| 2021/0067764 A1 | 3/2021 | Shau |

OTHER PUBLICATIONS

"A Novel Method of Video-Based Pupil Tracking", Proceedings of the 2009 IEEE International Conference on Systems, Man and Cybernetics, San Antonio, Tex., USA—pp. 1255-1262, Oct. 2009.
Athanasios Papoulis; A New Algorithm in Spectral Analysis and Band-Limited Extrapolation; IEEE Transactions on Circuits and Systems, Sep. 1975; vol. CAS-22, No. 9; pp. 735-742.
A Zandifar, R. Duraiswami, L.S. Davis, A video-based framework for the analysis of presentations/posters, 2003 (Year: 2003) 10 pages.
Barbara Zitova et al.; Image Registration Methods: a Survey; Department of Image Processing; Institute of Information Theory and Automation Academy of Sciences of the Szech Republic; Image and Vision Computing; pp. 977-1000.
B. K. Gunturk, "Super-resolution imaging", in Compu-tational Photography Methods and Applications, by R. Lukac, CRC Press, 2010 [Abstract Provided].
Cheng et al. Developing a Real-Time Identify-and-Locate System for the Blind. Workshop on Computer Vision Applications for the Visually Impaired, James Coughlan and Roberto Manduchi, Oct. 2008, Marseille, France.
Danny Keren et al.; Image Sequence Enhancement Using Sub-pixel Displacements; Department of computer science; The Hebrew University of Jerusalem; 1988 IEEE; pp. 742-746.
D. Li, D. Winfield and D. Parkhurst, "Starburst: A Hybrid algorithm for video based eye tracking combining feature-based and model-based approaches", Iowa State Univer-sity, Ames, Iowa.
Edward R. Dowski, Jr. et al.; Extended Depth of Field Through Wave-Front Coding; Apr. 10, 1995; Optical Society of America; vol. 34, No. 11; Applied Optics pp. 1859-1866.
Eran Gur and Zeev Zalevsky; Single-Image Digital Super-Resolution a Revised Gerchberg-Papoulis Algorithm; AENG International Journal of Computer Science; Nov. 17, 2007; pp. 1-5.
Extrema.m, http://lwww.mathworks.com/matlabcentral/fileexchange/12275-extrema-m-extrema2-m, Sep. 14, 2006.
Eyelink User Manual, SR Research Lid., Copyright 2005-2008, 134 pages.
Eyelink Data Viewer User's Manual, SR Research Lid., Copyright 2002-2008, 149 pages.
Fritz Gleyo, Microsoft May Make Life-Sized Cortana In Person For HoloLens, (Dec. 14, 2015).
Guestrin et al. "General Theory of Remote Gaze Estimation Using the Pupil Center and Corneal Reflections", IEEE Trans. Biomedical Eng., vol. 53, No. 6, pp. 1124-1133, June (2006).
Jessi Hempel, Project HoloLens: Our Exclusive Hands-On With Microsoft's Holographic Goggles, (Jan. 21, 2015).
John Bardsley et al.; Blind Iterative Restoration of Images With Spatially-Varying Blur; 9 pages.
J. Goodman, Introduction to Fourier Optics, 2nd edition, 160-165, McGraw-Hill, 1988.
Jordan Novet, Microsoft could build a life-sized Cortana for HoloLens, https://www.technologyrecord.com/Article/introducing-microsoft-hololens-development- edition-48296.
Kennet Kubala et al.; Reducing Complexity in Computational Imaging Systems; CDM Optics, Inc.; Sep. 8, J003; vol. 11, No. 18; Optics Express; pp. 2102-2108.
Lees et al. (Ultrasound Imaging in Three and Four Dimensions, Seminars in Ultrasound, CT, and MR/, vol. 22, No. 1 Feb. 2001: pp. 85-105, (Year: 2001).
Lindsay James, Introducing Microsoft HoloLens Development Edition, https://blogs.windows.com/ :levices/2015/04/30/build-2015-a-closer-look-at-the-microsoft-hololens-hardware/.

Lisa Gottesfeld Brown; A Survey of Image Registration Techniques; Department of Computer Science; Columbia University; Jan. 12, 1992; pp. 1-60.
Malcolm et al. Combining topdown processes to guide eye movements during real-world scene search. Journal of Vision, 10(2):4, p. 1-11 (2010).
Maria E. Angelopoulou et al.; FPGA-based Real-lime Super-Resolution on an Adaptive Image Sensor; Department of Electrical and Electronic Engineering, Imperial College London; 9 pages.
Maria E. Angelopoulou et al.; Robust Real-Time Super-Resolution on FPGA and an Application to Video Enhancement; Imperial College London; ACM Journal Name; Sep. 2008; vol. V, No. N; pp. 1-27.
Moreno et al. Classification of visual and linguistic tasks using eye-movement features; Journal of Vision (2014) 14(3):11, 1-18.
Oliver Bowen et al.; Real-Time Image Super Resolution Using an FPGA; Department of Electrical and Electronic Engineering; Imperial College London; 2008 IEEE; pp. 89-94.
Patrick Vandewalle et al.; A Frequency Domain Approach to Registration of Aliased Images with Application to Super-resolution; Ecole Polytechnique Federal de Lausanne, School of Computer and Communication Sciences; Department of Electrical Engineering and Computer Sciences, University of California; EU RAS IP Journal on Applied Signal Processing; vol. 2006, Article ID 71459, pp. 1-14.
P. C. Hansen, J. G. Nagy, D. P. O'Leary, Deblurring Images: matrices, Spectra and Filtering, SIAM (2006) [Abstract Provided].
P. Milanfar, Super-Resolution Imaging, CRC Press (2011) [Abstract Provided]
Pravin Bhat et al.; Using Photographs to Enhance Videos of a Static Scene; University of Washington; Microsoft Research; Adobe Systems; University of California; The Eurographics Association 2007; pp. 1-12.
R. W. Gerchberg, "Super-resolution through error energy reduction", Optica Acta, vol. 21, No. 9, pp. 709-720,(1974).
S. Chaudhuri, Super-Resolution Imaging, Kluwer Aca-demic Publishers (2001) [Abstract Provided].
Sang-Hyuck Lee et al.; Breaking Diffraction Limit of a Small F-Number Compact Camera Using Wavefront Coding; Center for Information Storage Device; Department of Mechanical Engineering, Yonsei University, Shinchondong, Sudaemungu, Seoul 120-749, Korea; Sep. 1, 2008; vol. 16, No. 18; pp. 13569-13578.
Sawhney, H. et al.; "Hybrid Stereo Camera: An IBR Approach for Synthesis of Very High Resolution Stereoscopic Image Sequences"; AC Siggraph, pp. 451-460; 2001 (10 pages).
Suk Hwan Lim and Amnon Silverstein; Estimation and Removal of Motion Blur by Capturing Two Images With Different Exposures; HP Laboratories and NVidia Corp.; HPL-2008-170; Oct. 21, 2008; 8 pages.
S.-W Jung and S.-J. Ko, "Image deblurring using multi-exposed images" in Computational Photography 65 Methods and Applications, by R. Lukac, CRC Press, 2010. [Abstract Provided].
Todd Holmdahl, Build 2015: A closer look at the Microsoft HoloLens hardware, https://blogs.windows.com/ :levices/2015/04/30/build-2015-a-closer-look-at-the-microsoft-hololens-hardware/.
Tod R. Lauer; Deconvolution With a Spatially-Variant PSF; National Optical Astronomy Observatory; Tucson, AZ; arXiv:astro-ph/0208247v1; Aug. 12, 2002; 7 pages.
V. Barmore, Iterative-Interpolation Super-Resolution Image Reconstruction, Springer (2009) [Abstract Provided].
W. Thomas Cathey et al.; New Paradigm for Imaging Systems; Optical Society of America; Applied Optics; Oct. 10, 2002; vol. 41, No. 29; pp. 6080-6092.
William T. Freeman et al.; Example-Based Super-Resolution; Mitsubishi Electric Research Labs; Mar./Apr. J002; IEEE Computer Graphics and Applications; pp. 56-65.
Zitnick, L. et al.; "Stereo for Image-Based Rendering Using Image Over-Segmentation"; International Journal of Computer Visions; 2006 (32 pages).
Z. Zalevsky, D. Mendlovic, Optical Superresolution, 2004 (Year: 2004) 261 pages.

(56)         References Cited

OTHER PUBLICATIONS

Saito et al., Very High Resolution Image Acquisition Through Image Reconstruction From Lower Resolution Images Taken With Multiple Cameras, Singapore ICCS/ISITA, IEEE 1992 (Year: 1992}.

* cited by examiner

201    IMAGE CAPTURING LENS SYSTEM    201

204

RING LENS

201    IMAGE CAPTURING LENS SYSTEM    201

205

TILTED LENSES WITH COMMON DETECTOR

302

301    INFRARED LEDs OR LENSED FIBERS    301

EYE MONITORING LENSES AND/OR CAMERAS

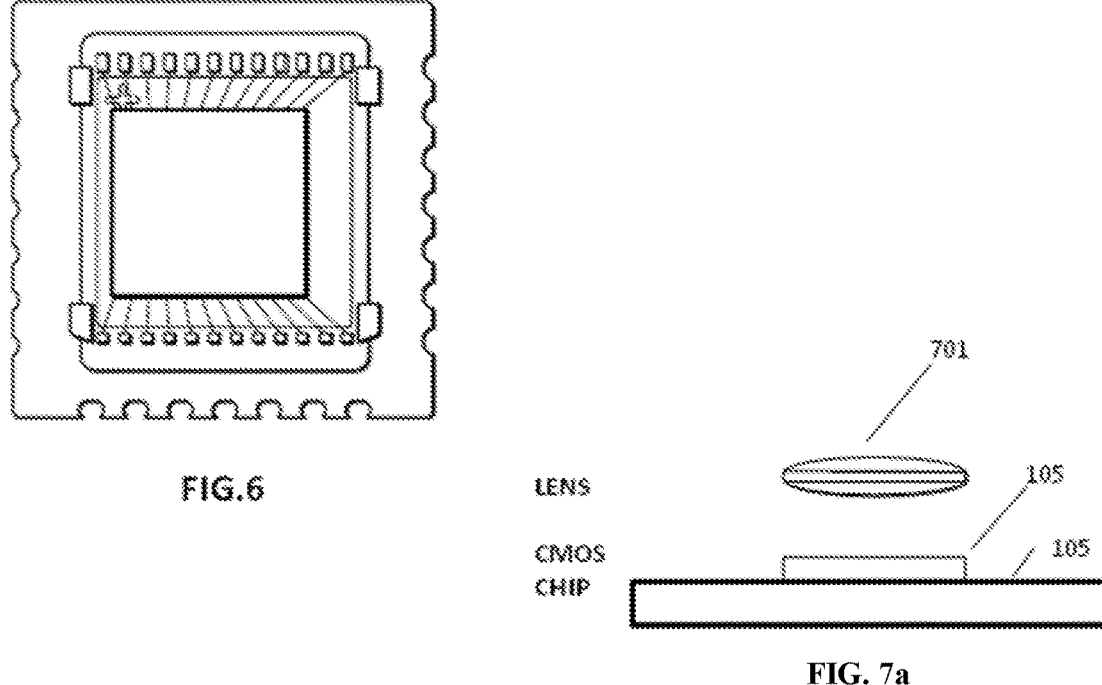
FIG.6
FIG. 7a
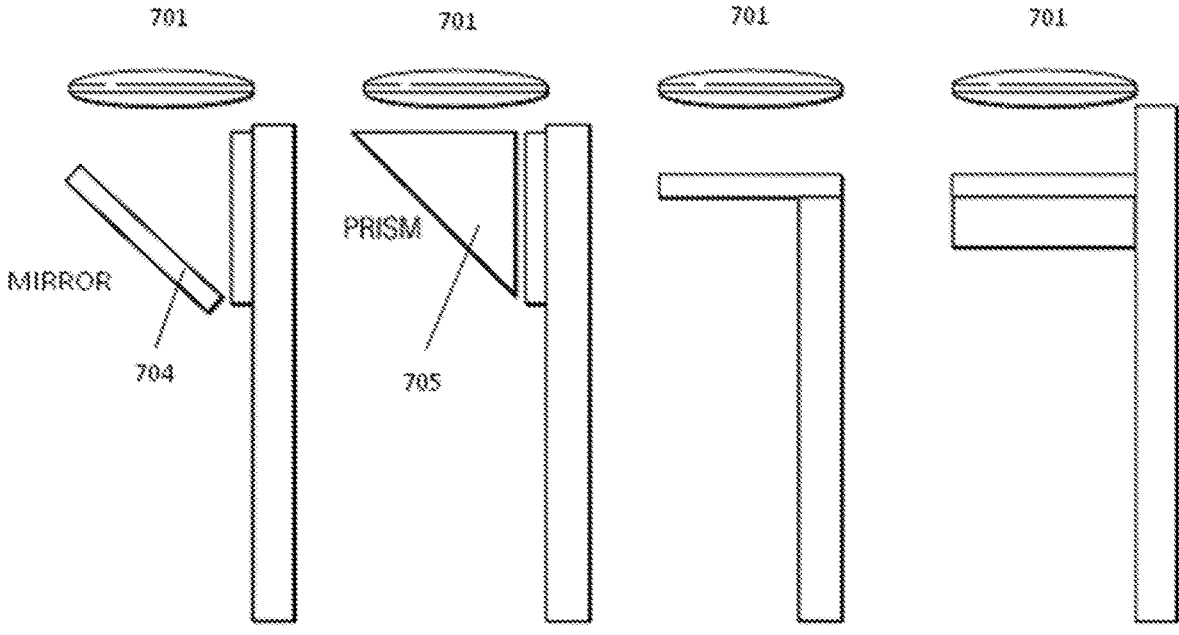
FIG.7b

CAMERA MODULE WITH SINGLE IMAGING LENS

CAMERA MODULE WITH THREE IMAGING LENSES

CAMERA MODULE WITH THREE IMAGING LENSES

CAMERA MODULE WITH THREE IMAGING LENSES AND THEIR FOVs

COMMON CMOS DETECTOR

HIGH-RESOLUTION SAMPLED AREAS OF THE LEFT FOV

METHOD AND APPARATUS FOR AN IMAGING DEVICE

CROSS-REFERENCE TO RELATED APPLICATIONS

This application is a continuation of U.S. patent application Ser. No. 18/363,726, filed on Aug. 1, 2023, which is continuation of U.S. patent application Ser. No. 16/901,761, filed on Jun. 15, 2020, now U.S. Pat. No. 11,716,449, issued on Aug. 1, 2023, which is a continuation of U.S. patent application Ser. No. 15/893,724, filed on Feb. 12, 2018, now U.S. Pat. No. 10,687,027, issued on Jun. 16, 2020, which is a continuation of U.S. patent application Ser. No. 14/523,386, filed on Oct. 24, 2014, now U.S. Pat. No. 9,894,326, issued on Feb. 13, 2018, which is a continuation of U.S. patent application Ser. No. 12/794,283, filed on Jun. 4, 2010, now U.S. Pat. No. 8,872,910, issued on Oct. 28, 2014, which claims the benefit of, and priority to, U.S. Provisional Application No. 61/184,232, filed on Jun. 4, 2009, each of which is hereby incorporated by reference herein in its entirety.

TECHNICAL FIELD

Embodiments of the invention related to devices and methods for recording video, and more particularly to eyeglasses having an integrated video recording device.

BACKGROUND

Cameras and camcorders are two main devices that people use to take pictures and create movies. To use these devices, one uses a viewfinder or display to select a scene or frame. As one is engaged in scene selection, he/she concentrates on what is being recorded. This is fine for professionals whose main job is taking photos or recording movies. However, the majority of camera and camcorder users are individuals who use these devices for personal use. For example, parents usually videotape their children during birthday parties and other special occasions such as children's performances at schools. As one tries to capture a moment carefully, he/she has to split his attention between recording the event and enjoying the experience. In effect, there is a contradiction between focusing on recording and enjoying the experience fully. Additionally, existing image and video recorder devices cannot be carried around all the time because of their bulk and weight; consequently, we miss to capture many unexpected and one of a kind moments.

SUMMARY

An embodiment of an image recording apparatus includes an eyeglass frame, at least one first optical unit disposed on the eyeglass frame for capturing a main scene image corresponding to a first field of view of a user, and at least one second optical unit disposed on the eyeglass frame for capturing an auxiliary scene image corresponding to second field of view of a user. The first and the second field of view of the user at least partially overlap. The image resolution of the main scene image is lower than the image resolution of the main scene image and the field of view of the main scene image is larger than the field of view of the auxiliary scene image. The image recording apparatus further includes at least one processor for receiving the main and the auxiliary scene images, and generating a modified resolution copy of the main scene image based on the auxiliary scene image.

BRIEF DESCRIPTION OF THE DRAWINGS

For a more complete understanding, reference is now made to the following description taken in conjunction with the accompanying Drawings in which:

FIG. 6 illustrates an embodiment of a camera chip;

FIG. 7*a* illustrates a basic configuration for a lens and camera chip;

FIG. 7*b* illustrates embodiments of a new configuration for camera chips;

DETAILED DESCRIPTION

Figure 1A:
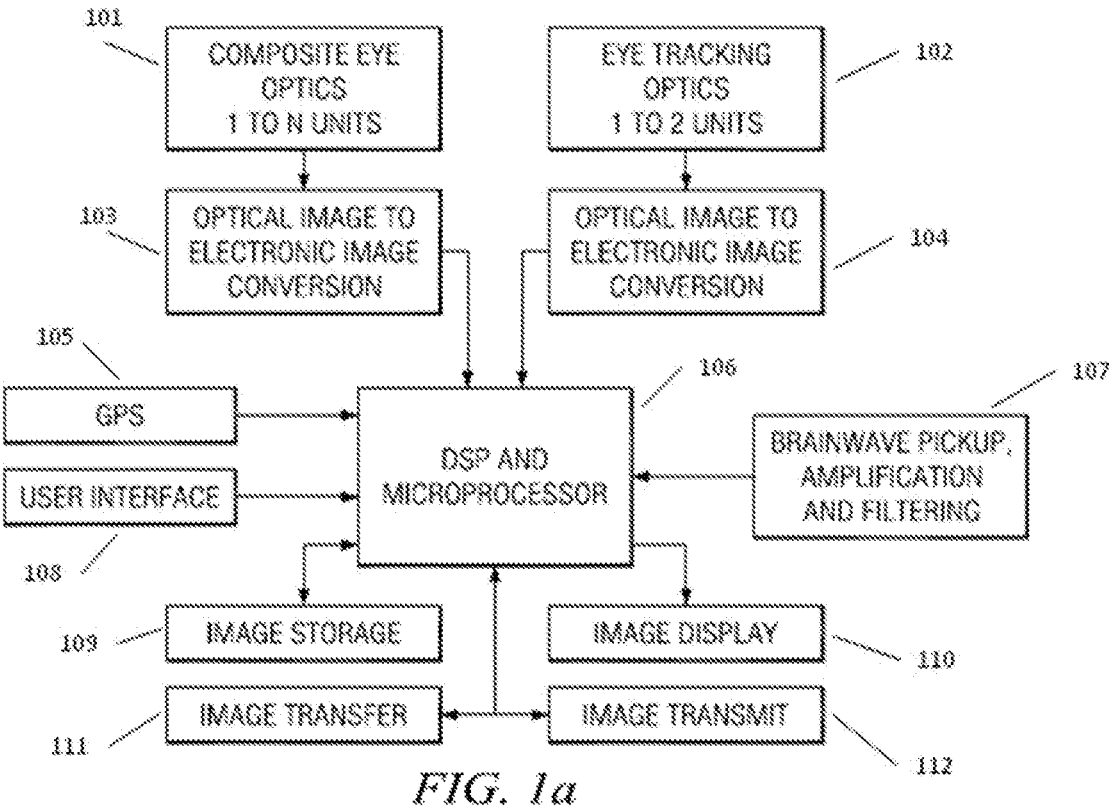
FIGS. 1*a* and 1*b* illustrate simplified block diagrams of embodiments of the eye-view recorder (EVR)

Referring now to the drawings, wherein like reference numbers are used herein to designate like elements throughout, the various views and embodiments of METHOD AND APPARATUS FOR AN IMAGING DEVICE are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

To address the issue with current cameras and camcorders, embodiments of a wearable and fully automatic video recorder are described herein. As the name "Eye-View Recorder" (EVR) may imply, embodiments of this video recording device view the world like a human eye. This feature is in contrast with the zooming feature of existing cameras and camcorders that can bring an object much closer to a viewer. The EVR will record the world like a human eye. Further details of various embodiments of the EVR are discussed below.

As opposed to existing video camcorders, various embodiments split the video recording device into two parts: an optical unit that views the world and an electronic box that contains processors, storage, battery, LCD display, user interfaces and communication ports. The optical portion is fitted within an eyeglasses frame and thus becomes wearable. The electronic box can, for example, fit in a pocket or can be worn like a necklace. The box communicates with the frame through either a wired or wireless connection. In a case of wired connection, the user may carry the electronic box, for example, in a pocket. When the box and the frame are connected wirelessly, in various embodiments the eyeglasses frame is all that is worn by the user.

A feature of various embodiments of the EVR is recording precisely what its user is viewing. To do this, EVR uses eye tracking to follow the user's eyes for scene selection. In this way, the camera records only what the user is looking at. The EVR also allows its user to focus on a scene and ignore short term "distractions." The user can initiate the recording manually by pushing a button on the electronic box or can choose a brainwave monitoring circuitry to trigger the recording. In the later case, the recording will start automatically as soon as something interests the user. For the automatic recording mode, the user's brainwaves (alpha and beta waves) may be monitored to start and/or stop recording. In some embodiments, an on-board GPS records location data for various video segments.

In at least one embodiment, the EVR has four distinct building blocks: the Composite Eye (CE), the Eye Tracking (ET), the Brainwave Monitoring (BM) and the Electronic Box (EB). The CE views the world and captures the field of view that is viewable to a pair of human eyes. The ET determines which direction the user's eyes are centered on. A processor on the EB uses the input from the ET and generates an image frame that the user's eyes had seen.

Figure 1B:
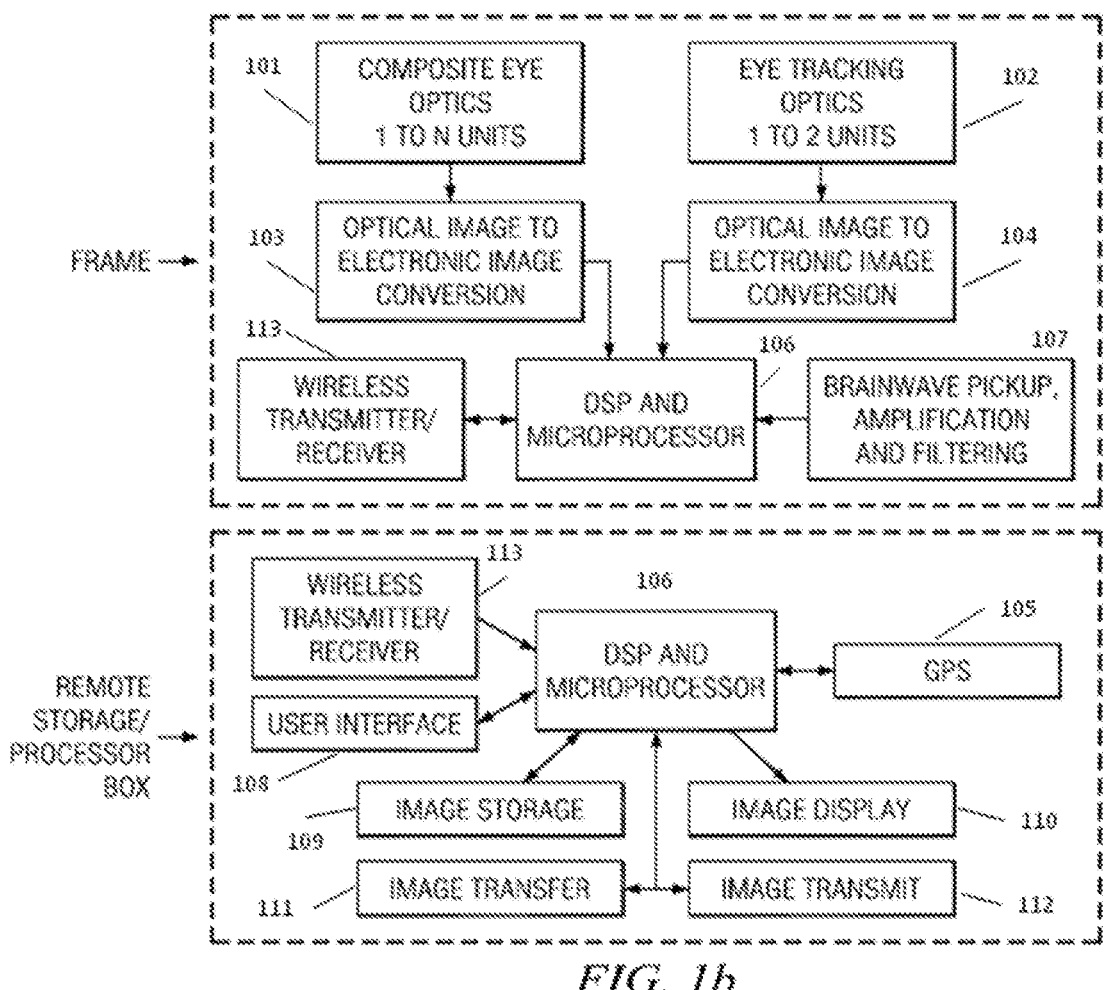

Simplified block diagrams of embodiments of the EVR are shown in FIG. 1a and FIG. 1b. FIG. 1a illustrates an embodiment having a frame wired to the electronic box and FIG. 1b illustrates an embodiment in which a frame and electronic box communicate wirelessly. Referring to FIG. 1a, the embodiment includes Composite Eye Optics units 1 to N in communication with a first Optical Image Electronic Image Conversion module, and Eye Tracking Optics units 1 to 2 in communication with a second Optical Image Electronic Image Conversion module. The first Optical Image Electronic Image Conversion module and second Optical Image Electronic Image Conversion module are in communication with a DSP and Microprocessor. A GPS module, User Interface module, Brainwave Pickup, Amplification, & Filtering module, Image Storage module, Image Display module, Image Transfer module, and Image Transmit module are further in communication with the DSP and Microprocessor. The Image Transfer module and the Image Transmit module are in further communication with each other.

Image Transfer is a PC interface or other interface such as USB, Image Transmit is a wireless device that could communicate with a wireless access point or a wireless network. The Optical to Electronic Image Conversion may utilize serial communication to transfer the image data to the DSP and Microprocessor unit. For example, camera chips based on SMIA (Smart Mobile Interface Architecture) provide serial data output. This reduces the number of wires/traces that must run from the frame to the box. Of course, parallel data transfer remains an option especially for very large pixel sizes.

Referring to FIG. 1b, the embodiment for a wireless implementation includes a frame and a remote storage/processor box (electronic box) in which there is no wired connection between the remote storage/processor box and the frame. The frame includes Composite Eye Optics units 1 to N, a first Optical Image Electronic Image Conversion module, Eye Tracking Optics units 1 to 2, a second Optical Image Electronic Image Conversion module, a first Wireless Transmitter/Receiver, a first DSP and Microprocessor, and a Brainwave Pickup, Amplification, & Filtering module. The remote storage/processor box includes a second Wireless Transmitter/Receiver, a second DSP and Microprocessor, a GPS module, a User Interface Module, an Image Storage Module, and Image Display module, and Image Transfer Module, and an Image Transmit module.

The Composite Eye Optics units 1 to N are in communication with the first Optical Image Electronic Image Conversion module, and the Eye Tracking Optics units 1 to 2 in communication with the second Optical Image Electronic Image Conversion module. The first Optical Image Electronic Image Conversion module, the second Optical Image Electronic Image Conversion module, the first Wireless Transmitter/Receiver and the Brainwave Pickup, Amplification, & Filtering module are in communication with the first DSP and Microprocessor. The second Wireless Transmitter/Receiver, the GPS module, the User Interface module, the Image Storage module, the Image Display module, the Image Transfer module, and the Image Transmit module are further in communication with the second DSP and Microprocessor. The Image Transfer module and the Image Transmit module are in further communication with each other.

In at least one embodiment, the wireless Transmitter/Receiver could be a Bluetooth module. Each unit (frame and electronic box) will have a power supply on its board. For this configuration, in at least one embodiment it is possible to use a smart phone as the electronic box as smart phones already have GPS, Bluetooth, User Interface, DSP/Microprocessor and access to a wireless network and Internet. Microphones/speakers on the eyeglasses frame can be used for hand-free calling as well. This enables smart phones to record digital still images and videos hands-free. A smart phone can also be used as the electronic box in FIG. 1a provided some modifications are made to the smart phone to accept and control the electronics that are installed within the eyeglasses frame.

Composite Eyes (CE)

To view the world, human eyes can rotate in two directions: up/down and left/right. Duplicating this capability within an eyeglasses frame is not easy when we consider constraints such as rotation and tilt speed of the lens, the required hardware and its power consumption. Rather than using a single lens that can be tilted in two orthogonal axes, various embodiments use an array of fixed lenses in the viewing optics to cover all the angles that an eye covers for a fix direction of head. This eliminates the need to rotate or tilt a viewing lens. In fact, the array of fixed lenses collects all the information all the time and because of this feature we can track the eye as fast as the eye tracking circuitry allows. With image buffering, it is possible to compensate for the delay time of the ET circuitry and achieve instantaneous eye tracking and image recording. As mentioned, the EVR captures all the details that its user might have or have not paid attention to. This gives the user a "second" chance to review the visual images that he/she was exposed to. Currently, no camera provides such a convenience. EVR has three display modes: 1. Show what eyes see; 2. Show ALL that a pair of eyes could have seen; and 3. Interactively display a portion of the total field but limited to the size that human eyes could have looked at.

Most cameras and camcorders have an adjustable focal length for zooming. A distinct feature of various embodiments of the device is viewing objects exactly like a healthy human eye. At least some embodiments limit the EVR to duplicating the human eye zoom range and the frame size of the video that it captures is similar to the frame images that a human brain receives.

To duplicate human eyes' zooming capabilities, various embodiments use a few groups of cameras in addition to using phase front coding and digital zoom. Each group of cameras has one focal point. In the simplest case, only one group of cameras that mimic human eyes from a meter up to infinity are used. This is the EVR's primary "eye." Seeing like a human eye makes embodiments of the device suitable to serve as a memory aid for many people. In fact such video recordings provide subjective visual perception of the user's environment for the first time.

The eye viewing section consists of an array of small lenses with their associated CCD or CMOS detectors. The lenses are arranged such that each one has some overlap with its neighbors and the total field of view of the composite lens matches that of a human for a fixed head position. Images from various lenses are sent to a buffer and assembled to provide a final total image after removing the redundancies. This processing and assembly step is similar to generating a panoramic image from a set of images taken by the same camera, which is well known to those familiar with the art.

Figure 2A:
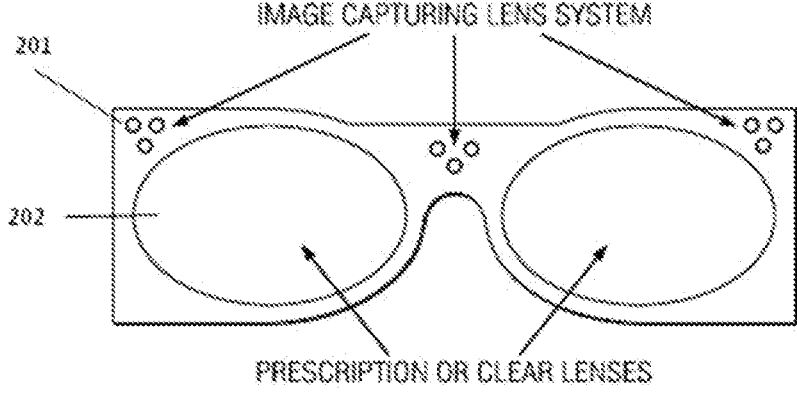
FIGS. 2*a*-2*d* illustrate embodiments of four different lens configurations for the EVR.
Figure 2B:
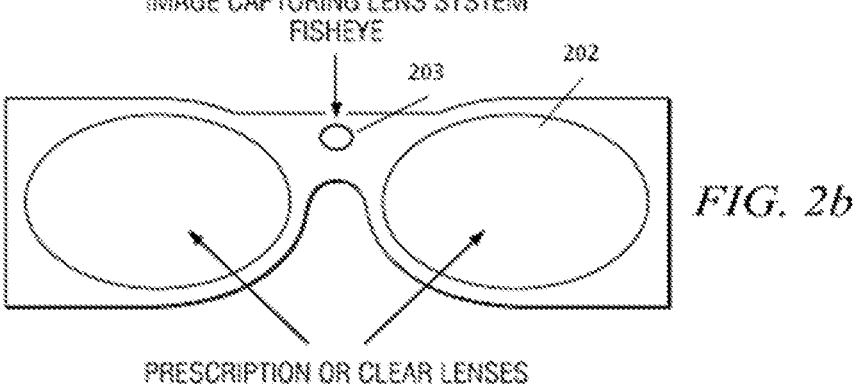

FIGS. 2a-d illustrate embodiments of four different lens configurations for the EVR. FIG. 2a shows three groups of lenses mounted in a frame. This is a generalized implementation with the largest number of lenses among the presented four cases. Simpler implementations are possible by using less number of lenses. For example, as shown in FIG. 2b, it is possible to use a single fisheye type to capture the total possible field of view. In that case, wave front coding and electronic processing is used to provide zooming capability and unwrapping of the fisheye image.

Figure 2C:
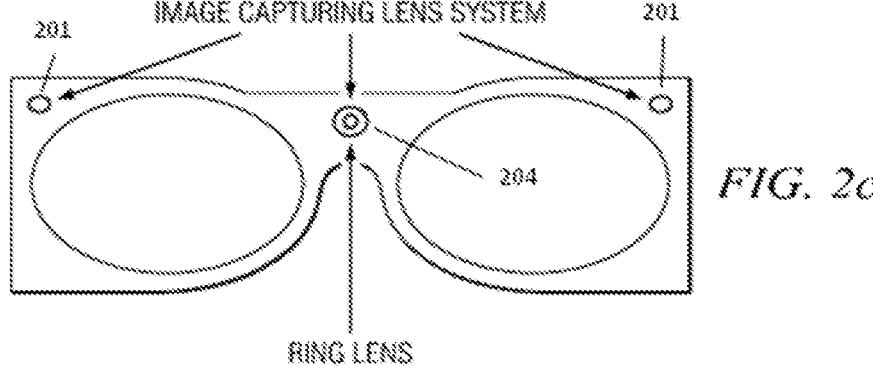
Figure 2D:
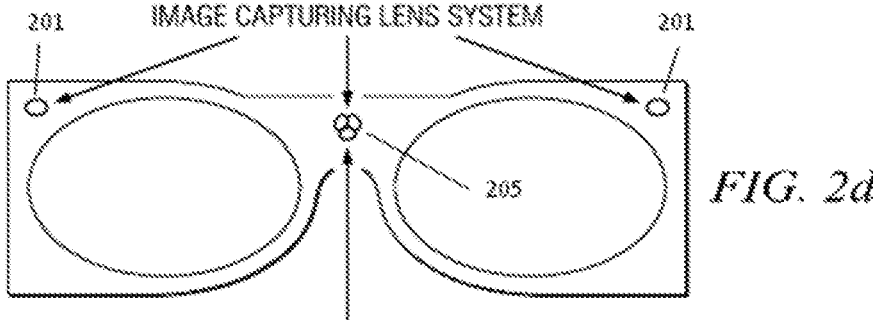

FIG. 2c shows another implementation with three lenses: two lenses to capture the direct view and a ring-type lens to capture the peripheral view. In essence this is similar to the fisheye single lens approach. However, the fisheye lens is considered as being made up of two parts, a central lens and a peripheral lens in the shape of a ring. This split reduces the electronic processing which in turn may lower electrical power consumption. The additional direct view lens provides stereo image recording as well as telemetry information. It is well known that by using two stereo cameras distance profile of an object from the lenses can be estimated. With the stereo approach, the direct field of view may also be recorded with much more resolution than the peripherals. Blocking a circular section of a fisheye lens in the center and an annular section on the side can result in a ring-type lens. In FIG. 2d, instead of a ring-type lens we use three tilted lenses to view the peripherals.

Regardless of optical arrangements, the end result will be to capture the total possible field of view. Once a total field image is generated, EVR uses the input from the eye tracking circuitry to find out which section of the total field is being viewed by the eye. This section is selected and is sent as the image output to the recording and/or the display screen. The viewing lenses of EVR are calibrated against healthy human eyes. This means that for any image captured by a single lens, we know how to map that image to a human eye's field of view.

If we use a lens with the same focal length as a human eye for seeing distant objects, then we can calculate total field of view for the human eye from pupil size information. Using this information, we will use the corresponding subset of the captured final image to display and record what the human eye would have seen. This is a color image.

The EVR gets two inputs to determine the pupil size. The first input comes from the eye tracking (ET) circuitry images and the second comes from the total optical power that the detector has received. Human pupil size varies directly by the total incident optical power. Knowledge of pupil size will reduce search time to locate pupil in the frame.

In the preferred embodiment of EVR, the composite eye viewing lenses have their detector counterparts plus analog to digital converters (ADC) in the frame area. But the image processing ASICs may be placed either in the eyeglasses frame, or in the electronic box. The same could be applied to the tracking lenses as well.

To make the frame lighter and simpler, as an alternative implementation, the detector and electronic components are moved to the electronic box and each lens and its associated detector are connected using a length of imaging fiber. This makes the frame area a totally passive area that has no electrical power and communicates optically with the main electronic box.

The EVR may have one or two microphones to capture the audio along with video. The microphones maybe placed inside the frame/temple or in the electronic box.

With two lenses on the two sides of a frame (stereo images), the distance of any object from the camera can be estimated. To do this, a common feature on both image sensors is found and the location of the feature is compared from one sensor to the other. Once an estimate of the distance is found, knowledge of the field of view of the lenses is used to estimate the image size (angular view) for a normal eye. This is key to determining the right image size before a scene is recorded.

Eye Tracking

The eye tracking circuitry has two functional blocks: image gathering optics and electronics processing. The optics portion is installed within the eyeglasses frame and facing user's eyes and the electronic processing part is placed in the main electronic control and storage box.

Figure 3:
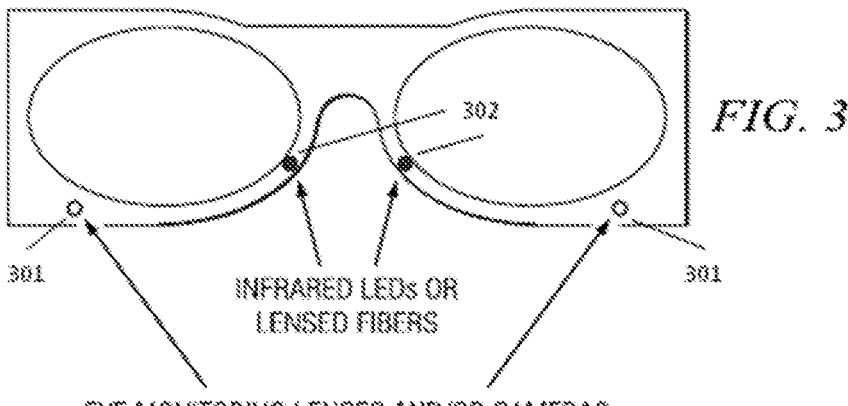
FIG. 3 illustrates an embodiment of an optical portion showing an infrared light for illuminating an eye surface and an image capturing lens and detector to view the eye.

The optical portion of the eye tracking circuit consists of two parts: an infrared light for illuminating the eye surface and an image capturing lens and detector to view the eye. An embodiment of an optical portion showing these two parts is shown in FIG. 3. The captured images, which are in black and white, are used to map out the location of the center of the eye pupil. It is well known that the eye pupil absorbs more light than the tissues around it. This makes the pupil darkest in captured images. The detectors used in this section have much less resolution than the outside world viewing optics. The collecting lens may be a pinhole protected/covered by a piece of glass and an infrared filter.

In various embodiments, the sources of the infrared light are LEDs. The LEDs can be placed in the inner side of the eyeglasses frame or be housed in the main electronic box. In the later case, lensed optical fibers are used to bring the light to the frame area. Lensed optical imaging fibers can also be used to transmit the viewed images of the eye to the electronic box for processing of the eye tracking data. If fibers are used to transfer images, a detector surface for more than one lens or a larger detector may be used to detect light from more than one lens.

Brainwave Detection

In various embodiments the Alpha and Beta brain waves of the user are monitored. It is well known that when someone starts to pay attention or focuses on something, the magnitude of the Alpha waves goes down from its maximum to almost zero while at the same time the intensity of the Beta waves are increased from zero level to a maximum. Brainwave detection requires two logical blocks. An antenna placed within the frame and the temple is used to pick up the waves. The detected waves are amplified, filtered out from the noise and measured in the main electronic box. In at least one embodiment, the EVR uses the brainwave detector to automatically start the recording process.

Electronic Box

Location and date information are two easy ways for tagging the captured video and audio information. In various embodiments, a GPS chip is placed on the main board to record the location information for various video segments. Time information is also created and recorded as done routinely on many electronic devices and hence does not need to be discussed further in this write-up.

For storing video data in various embodiments, two methods may be used:

1. On-board memory
2. Storing to a network attached storage device using wireless means. The storage device could be a server within a local area network or a server on the Internet.

The eyeglasses frame and the electronic box communicate with wire or wirelessly. In the case of wire communication, the frame may receive electrical power from the electronic box via wires. In the wireless case, a small battery may be placed within eyeglasses temples. In both cases, wires may run through the temples for data communication and power delivery. When the frame is totally passive, no wire goes from the electronic box to the frame. Instead, optical fibers may serve as the communication means.

Various embodiments of the EVR may use wireless transmission for some models to transmit the images to a web server for live broadcast to select users or for further processing.

In various embodiments, the EVR can be set to be always on as one mode of operation. In this case, the device uses a circular buffer that covers a time span, for example a one-minute time span. With this feature, the user has ample time to capture unexpected moments.

As described above, in various embodiments the hardware for eye-view recorder may be placed within the eyeglasses frame. This allows installing clear or prescription lenses in the standard lens locations.

Figure 4:
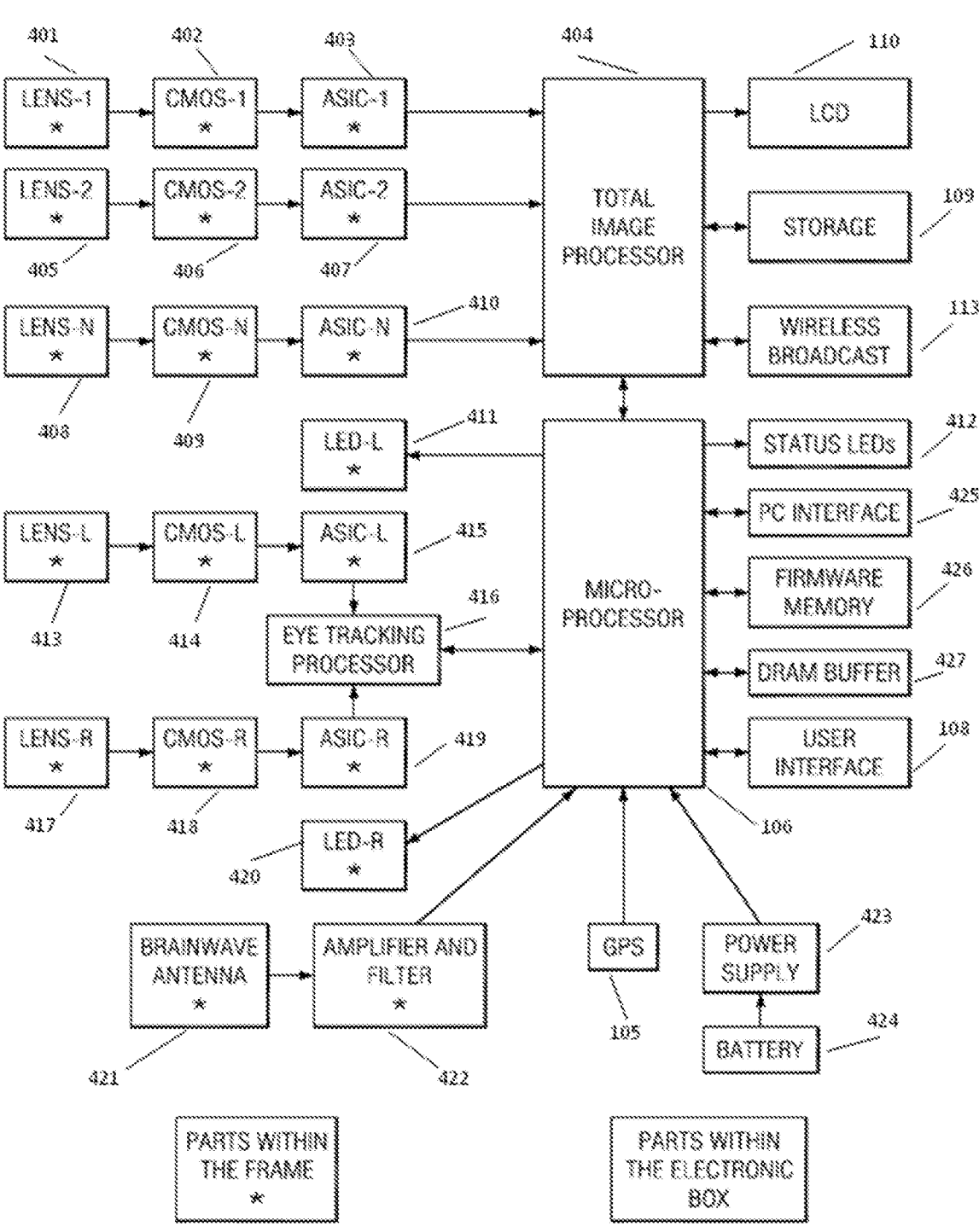
FIG. 4 illustrates an embodiment of a wired implementation of the EVR using discrete camera components.
Figure 5:
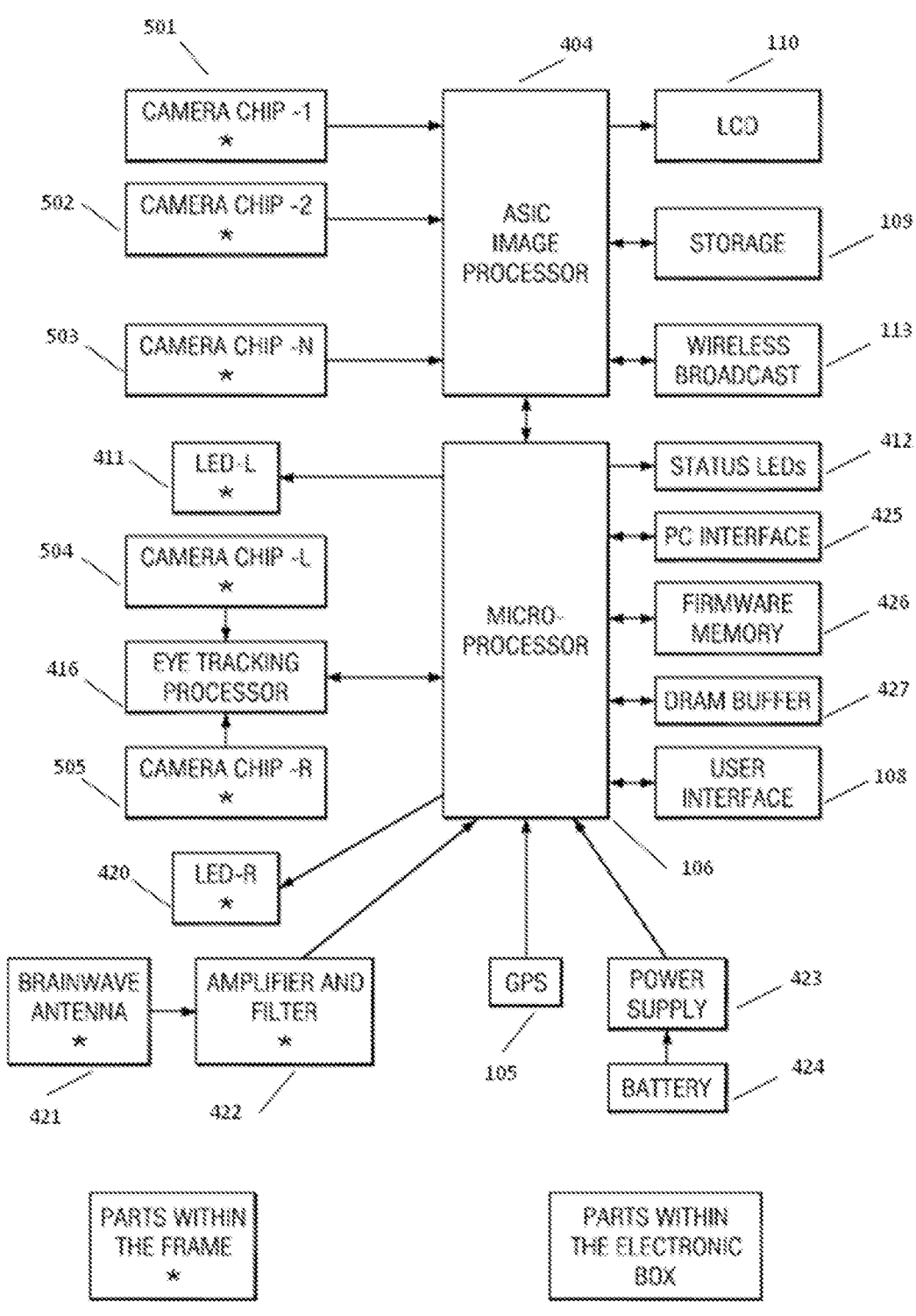
FIG. 5 illustrates an embodiment of a wired implementation in which chip-cameras are used.

In FIGS. 4 and 5, overall block diagrams of the EVR are illustrated using discrete camera components (FIG. 4) or camera chips (FIG. 5). Referring to FIG. 4, an embodiment of a wired implementation of the EVR using discrete camera components is illustrated in which two lenses for camera and another two for eye monitoring, left (L) and right (R) are assumed, and one or more ASIC (image processor portion of a camera chip) are used. The embodiment includes Lens modules 1-N in communication with a Total Image Processor through CMOS modules 1-N and ASICs 1-N, respectively. An LCD module, a Storage module, and a Wireless Broadcast module are also in communication with the Total Image Processor. A Lens-L module is in communication with an ASIC-L module via a CMOS-L module. A Lens-R module is in communication with an ASIC-R module via a CMOS-R module. The ASIC-L module and the ASIC-R module are in communication with an Eye Tracking Processor. The Eye Tracking Processor is further in communication with a Microprocessor. The Total Image Processor is in communication with the Microprocessor. An LED-L module, an LED-R module, status LEDs, a PC interface, firmware memory, a DRAM buffer, a User Interface module, and a GPS module is also in communication with the Microprocessor. A Brainwave Antenna is in communication with an Amplifier & Filter module, which is further in communication with the Microprocessor. A power supply powered by a battery is further coupled to the Microprocessor.

In the particular embodiment illustrated in FIG. 4, the Lens modules 1-N, the CMOS modules 1-N, the ASICs 1-N, the Lens-L module, the CMOS-L module, the ASIC-L, the Lens-R module, the CMOS-R module, the ASIC-R, the LED-L module, the LED-R module, the Brainwave Antenna, and the Amplifier & Filter module are included within the frame. The Total Image Processor, the Microprocessor, the Eye Tracking Processor, the LCD module, the Storage module, the Wireless Broadcast module, the Status LEDs, the PC interface, the Firmware Memory, the DRAM buffer, the User Interface module, the GPS module, the power supply, and the battery are included within the electronic box.

FIG. 5 illustrates an embodiment of a wired implementation in which chip-cameras are used instead of discrete components. The embodiment includes camera chips 1-N in communication with an ASIC image processor. An LCD module, a Storage module, and a Wireless Broadcast module are also in communication with the ASIC Image Processor. A camera chip-L and a camera chip-R are in communication with an Eye Tracking Processor. The Eye Tracking Processor is in further communication with a Microprocessor. The ASIC Image Processor is in communication with the Microprocessor. An LED-L module, an LED-R module, status LEDs, a PC interface, firmware memory, a DRAM buffer, a User Interface module, and a GPS module is also in communication with the Microprocessor. A Brainwave Antenna is in communication with an Amplifier & Filter module, which is further in communication with the Microprocessor. A power supply powered by a battery is further coupled to the Microprocessor.

In the particular embodiment illustrated in FIG. 5, the camera chips 1-N, the camera chip-L, the camera chip-R, the LED-L module, the LED-R module, the Brainwave Antenna, and the Amplifier & Filter module are included within the frame. The ASIC Image Processor, the Microprocessor, the Eye Tracking Processor, the LCD module, the Storage module, the Wireless Broadcast module, the Status LEDs, the PC interface, the Firmware Memory, the DRAM buffer, the User Interface module, the GPS module, the power supply, and the battery are included within the electronic box.

All the elements that are needed in the electronic box are found or can be easily added to smart phones. Hence, in various embodiments it may be preferable to use such a smart phone as the electronic box because almost everyone is or will be carrying a smart phone soon. Also, almost everyone needs sunglasses or a prescription glasses. Clip-on sunglasses are common and may be used on the EVR frame. Permanent prescription or sunglasses lenses can also be installed in the EVR frame, as shown in FIG. 2.

Lens, Detector and Image Processor Arrangement

There are a number of companies that provide "chip camera" for mobile phones and personal computers. These chips include a CMOS detector, analog to digital converters, color balance and many other functions that are needed to produce an image. The goal of such designs is to reduce integration effort and lower product cost. While the viewing lenses for such chips have a diameter of a few millimeters, the camera chip area is about 10 times larger than the lens area. It should be kept in mind that the lens plane is parallel to the chip surface in such camera chips. Such an arrangement is not aesthetically pleasing in an eyeglasses video recorder. An illustration of an embodiment of a camera chip is shown in FIG. 6. As seen in FIG. 6, the total chip area is about 9 times that of the CMOS detector.

In the following paragraph a few approaches are outlined to address this issue for EVR implementation. The basic configuration for a lens and camera chip is shown in FIG. 7a. As seen in FIG. 7a, the lens and the chip planes are parallel. We may use such an arrangement for the lenses that are placed in the middle of the frame. For the lenses that reside on the two sides (left and right) of the frame, the lens plane may be made perpendicular to the CMOS and chip plane.

Embodiments of a new configuration for camera chips are illustrated in FIG. 7b.

Personal Search Engine (PSE)

Given the ease of use of a hands-free video recording device as discussed herein, each user may generate a huge amount of recorded personal video each year. Therefore, it may be very important to be able to index, search and sort the recorded information. As mentioned and implied, the reported device can generate a large amount of video data every year. This huge information is however personal and must be managed to become useful. To do this, a personal search engine that crawls through the videos and indexes them as soon as they are downloaded may be provided. For example, the personal search engine software may employ voice to text technology to create keywords based on the audio information part of the video. Also shape and face recognition are used to further index the videos. The search engine can be trained by associating names to faces and this can be further used to index personal videos. The search engine is also capable of summarizing a video and in doing so individuals can create daily summaries of their lives or compile their own life stories by editing the summaries. The daily summaries can also be posted as video logs (vlog) online.

Video summaries can be created in different ways. One criterion for summarizing videos is based on the recorded brainwaves. Each segment summary may be chosen based on the intensity of the brainwaves. Parts of the video segment where attention is reduced may be ignored and the total length of the summary could be subject to a time constraint. Another criterion for summarization could be location change. As mentioned already, EVR may employ a GPS or utilize wireless signals to extract the location information and use it as a tag or metadata.

In the foregoing discussion, embodiments of a dynamic and hands-free Eye-view Video Recorder (EVR) were described. In one implementation of that device a pair of eyeglasses' frame is modified to enclose a lens and CCD or CMOS and its associated electronics. To be practical, the eye view recorder should be lightweight, easy to wear and have a non-distractive appearance (be aesthetically pleasing). To achieve this goal, it is desired that the camera module (lens and the detector) be as small as possible. One way to lower the size is to use smaller lenses and detector chips with lower pixel counts. However, this degrades the resolution and quality of the video. In the following discussion, embodiments of various techniques and devices are described to implement an eye-view recorder with high resolution video using small optical lenses or modules.

Figure 8:
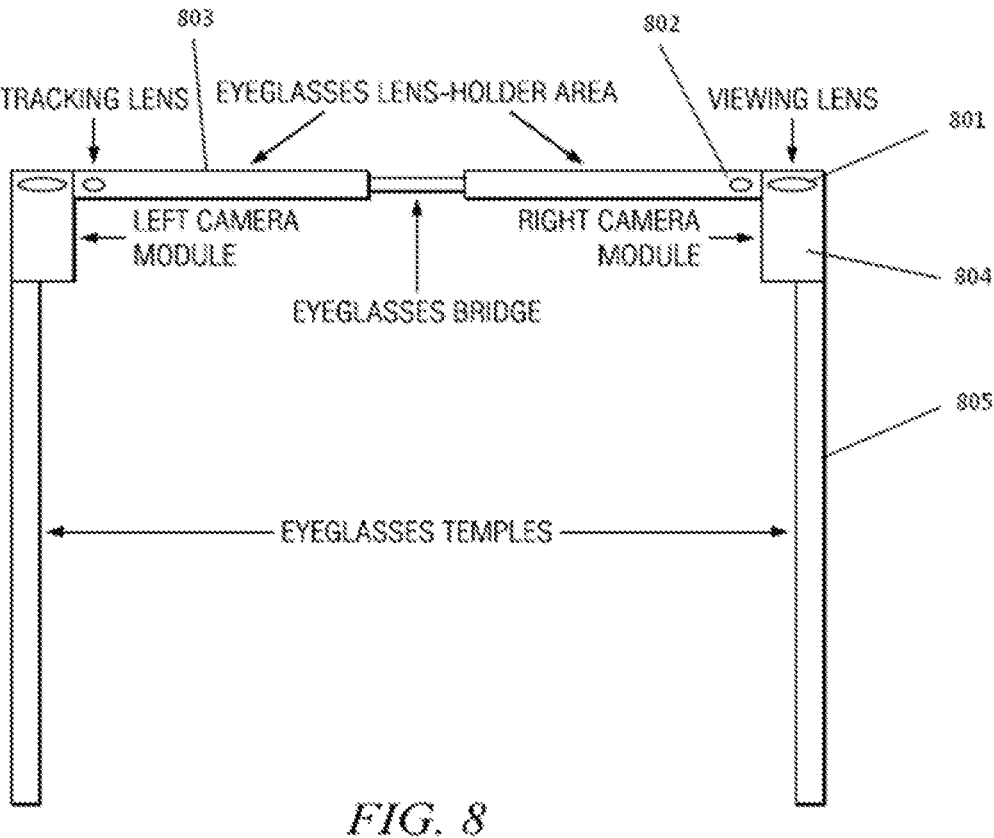
FIG. 8 illustrates a diagram of an embodiment of an EVR.

A diagram of an embodiment of an eye-view recorder is shown in FIG. 8. An EVR has two groups of cameras or lenses. The embodiment illustrated in FIG. 8 shows an eyeglass frame having a left template (or left arm) coupled to a left eyeglass lens holder area, and a right template (or right arm) coupled to a right eyeglass lens holder area. The left eyeglass lens holder area is coupled to the right eyeglass lens holder area view an eyeglass bridge. Viewing Cameras record the outside world or a scene of interest. Tracking Cameras monitor the eyes of the user. In the particular embodiment illustrated in FIG. 8, a left camera module is disposed within or on the left eyeglass template proximate to the left eyeglass lens holder area and a right camera module is disposed within or on the right eyeglass template proximate to the right eyeglass lens holder area. A left tracking lens is disposed in or on the left eyeglass lens holder area proximate to the left camera module, and a right tracking lens is disposed in or on the left eyeglass lens holder area proximate to the right camera module.

The following disclosure will focus mainly on embodiments of the viewing camera array that views the world while ignoring the eye-tracking cameras (tracking camera) as far as resolution improvement is concerned. In the described embodiments, each pair of eyeglasses has two arms, left and right or L and R, for short. One embodiment of the camera is shown in FIG. 8 as described above. Further embodiments of the eye-view recorder (EVR) are described below.

Figure 9:
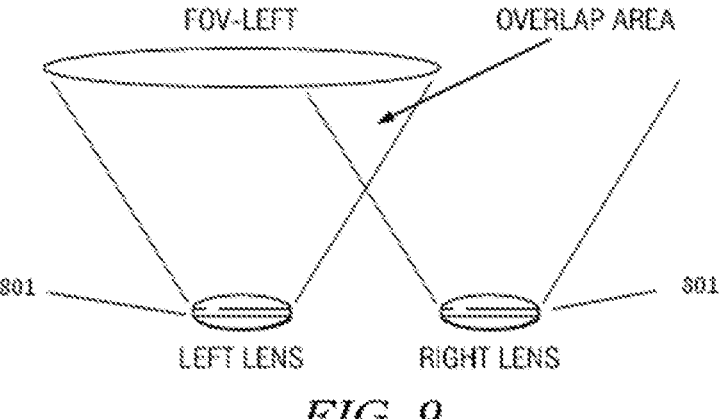
FIG. 9 illustrates an embodiment in which identical lenses are disposed on each arm of the EVR.

In the embodiment illustrated in FIG. 9, identical lenses (or camera chips/modules that include the lens and the detector and image processor) are disposed on each arm of the EVR. With this configuration a 3D (stereo) video recorder is provided. For example, a ¼" lens with a typical field of view (FOV) of about 45 degrees can be placed on each arm. By providing an overlap area similar to human eyes, this camera can be turned into a 3D (three dimensional) video recorder. The two cameras could also be arranged for a small overlap to maximize the horizontal FOV One implementation of this arrangement is to use focus invariant camera chips such as that of OmniVision Technologies' TrueFocus camera chips in each arm. These modules are small in size and lightweight. With such lenses, a high quality video can be captured with a singlet (a single lens) as opposed to compound lenses that are standard. A single lens imaging system is described in U.S. Pat. No. 7,106,510 to Dowski, Jr which is incorporated herein by reference in its entirety.

Figures 10, 11A, 11B, 11C, 12, 13:
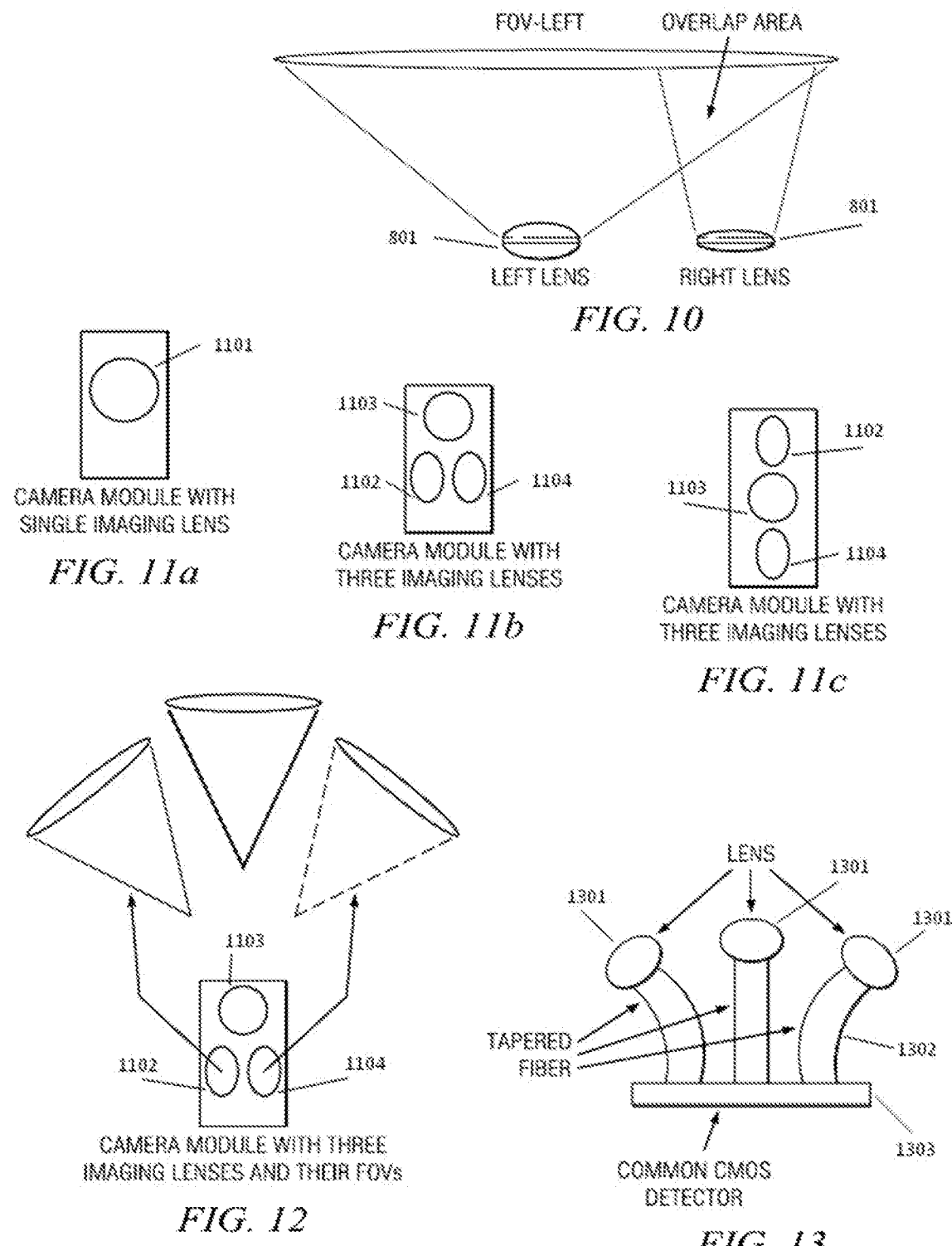
FIG. 10 illustrates an embodiment in which dissimilar lenses are used on the each arm of the EVR.
FIG. 11*a* illustrates an embodiment of a camera module with a single imaging lens.
FIGS. 11*b* & 11*c* illustrate embodiments of camera modules with three imaging lenses.
FIG. 12 illustrates an embodiment of a camera module with three imaging lenses and their corresponding field of views (FOVs)
FIG. 13 illustrates an embodiment in which fused fiber tapers are utilized to couple lenses outputs into a common CMOS detector.

FIG. 10 illustrates an embodiment in which dissimilar lenses are used on the each arm of the EVR. In the illustrated embodiment, a large FOV (such as a fisheye lens) is placed on one arm and a typical lens (about 45 degrees) or a lens with smaller FOV is placed on the other arm. With this arrangement, the camera can capture two views of every scene, a high resolution but narrow FOV and a lower resolution but wider FOV (similar to human peripheral view.) When such a recorded video is played back, the user will have the option to interactively switch between the two views. The center portion of the wide FOV image may also be replaced with the high resolution image from the other camera. This combination of high resolution at the center and lower resolution on the peripheral resembles human vision, the low resolution being the periphery and the high resolution being the center of attention. This presents a new way to show video: not just the focus of the attention but to include a peripheral view just like human eyes. Furthermore, super-resolution techniques may be utilized to enhance the low-resolution image via the high-resolution images taken by the other camera. The basic principle of resolution enhancement which may be employed in various embodiments is discussed in Joseph Goodman, "Introduction to Fourier Optics," 3rd edition, 2005, Section 6.6, ISBN 0-9747077-2-4. Also, enhancing a low resolution image by a high resolution image is well-known and reported in digital image processing literature. Various embodiments may implement such a technique and to apply it to video to compensate for the reduced size of the lens and/or the detector. By doing this, a high-resolution shot of the wide FOV images will be generated and the resultant video stored for interactive display or showing Region Of Interest (ROI) from the eye tracking circuit. In the interactive case, the user can steer the camera after the fact per his/her interest. This makes video watching interactive. High-resolution review on the fly may also be provided when the user wants to view a certain region of the low resolution image. This will allow use of less storage memory space which will be highly useful to storing data from security cameras. Feedback from eye tracking circuitry may also be used to display where users' eyes are focusing. Effectively, this technique allows following a user's eyes with a fixed lens and still create a high resolution image at every angle. Normally, a camera tilt and pan are done through mechanical means but here we achieve the same objectives with two fixed camera modules and with the help of super-resolution techniques.

In a particular embodiment, the user has the option to enhance the image with the electronic box that comes with the glasses or it can be done later on a PC or on a server. This extends battery life of the electronic box.

In the previous embodiment, instead of using a camera module with a single imaging lens as illustrated in FIG. 111*a*, an array of small lenses may be used, such as the camera modules with three imaging lenses as illustrated in FIGS. 11*b* & 11*c*, to cover a desired large field of view (FOV). FIG. 12 illustrates an embodiment of a camera module with three imaging lenses and their corresponding FOVs. This allows the thickness (width) of each arm to be reduced at the expense of increasing the height of the viewing camera modules. Each smaller camera may have its own detector or all the smaller lenses utilize different areas of the same but a larger detector such as illustrated in FIG. 13. In FIG. 13, an embodiment is illustrated in which fused fiber tapers are utilized to couple lenses outputs into a common CMOS detector. As an example, the fused fiber tapers by Schott can achieve 100 LP/mm of resolution. An advantage of using a single detector is reducing the electronics in the eyeglasses arms. By using a larger detector, the same ADC (Analog to Digital Convertor) can be used as well as the same image processing unit and reference clock. Consequently, a reduction in power consumption may be achieved compared to the case of in which multiple detectors are used.

In other embodiments, instead of a typical lens, an array of smaller lenses may be used. For example, one implementation replaces a typical ¼" lens with three ⅛" or ⅛" lenses. Again the three lenses could share the same detector or have their own independent detectors. However, in this implementation, all three lenses must point in the same direction. The three lenses have a single color filter per module. In this case, one camera sees only the green color, the other blue and the last one red. It is possible to use two lenses instead of three. In this case, the first camera will have a green filter and the second camera with have a color filter array with alternating red and blue filters. Because the human eye is more sensitive to the green color, one module for green color may used but red and blue colors may share another camera. An advantage of using three modules with three different color filters is to eliminate computation in the image pipe to estimate the missing colors, and to eliminate numerical artifacts that results due to such computations.

In still another embodiment, small camera chips such ¹⁄₁₀", ¹⁄₁₃" or ¹⁄₁₈" are embedded in the frame for eye tracking purposes. With such tracking cameras in place, the EVR will know where the user is looking. This information may be used to generate one version of the recorded video to be only what the user looked at as monitored by the eye tracking circuit. One or two tiny cameras may be used to monitor the gaze direction. For these cameras, very low power infrared LEDs may be placed to illuminate the eye surface. The detector may include an IR filter to block all the other unwanted lights. As commonly known, infrared is eye-safe. Since it is only necessary to illuminate the eye surface from a very close distance, lower doses of IR power may be used.

Figures 14, 15:
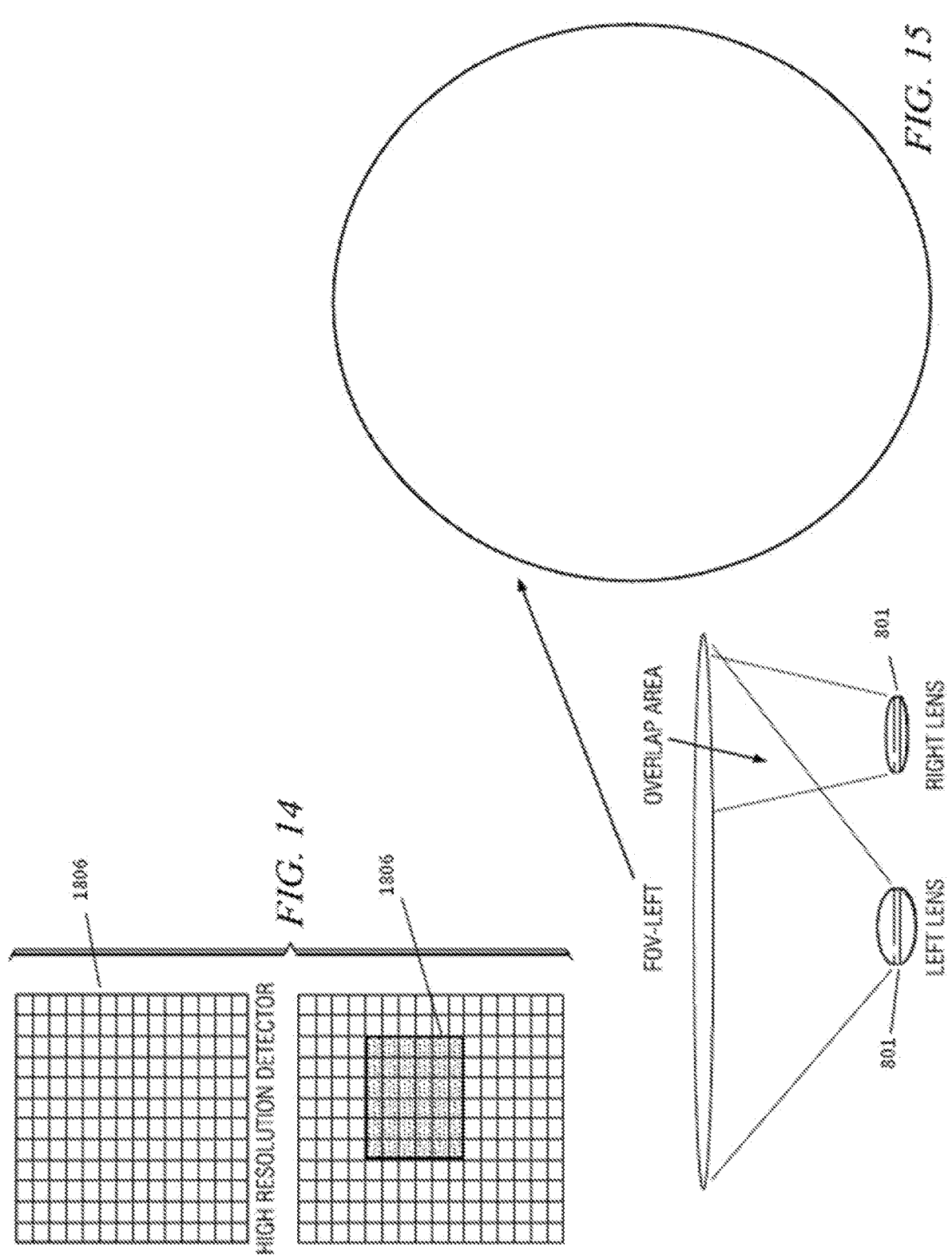
FIG. 14 illustrates binning on a high resolution detector.
FIG. 15 illustrates an embodiment of the EVR showing two lenses on the right and left sides of the frame, their associated FOV, and display of left FOV in the orthogonal plane.

Still another embodiment is based on utilizing the eye-tracking circuit discussed above. As is known, human eye vision has two regions: high sensitive area (fovea vision) that is used to concentrate and read with and the rest which is called peripheral view. Text cannot be read in the peripheral view. In this embodiment, this feature is duplicated with the eye-view recorder (EVR). First, a high-resolution sensor, for example, a four-mega pixel detector, reads all the pixels. In one mode, the input from the eye-tracking circuit is used to determine the gaze direction, which is most of the time in the head direction. The scene distance from the user is also determined from the stereo images that are collected through two different cameras. The angular range of human focus is also known and the distance information is used to decide what portion is to be shown with high resolution. This is displayed as a square area (all screens that are used are rectangular), which is the closet to a circle that can be seen. The focus area can also be shown as a circle, but then this circle is enclosed within a 4×3 or 16×9 rectangle to show only the region of interest. Another option is to show the focused area within the recorded peripheral view. The user can choose to show the peripheral as human like or with high resolution. For human like display, the resolution of the peripherals needs to be lowered. This is done two ways. First, A group of pixels is binned and their outputs are read as only one pixel. Second, low pass filtering is used once all data is collected or just prior to display. Such display techniques may be used for stereo cameras, especially for cameras embedded within eyeglasses frames. The concept of a high-resolution detector and binning to have two regions with high and low resolutions is shown in FIG. 14. FIG. 14 shows binning on the high resolution detector: all pixels shown (top), Region Of Interest (ROI) shown in gray has 4 times more resolution than the peripherals (bottom).

In another embodiment, after recording the outputs of the outward looking viewing cameras, a matched filtering technique (such as Weiner—See Fourier Optics by Joseph Goodman) is first used to de-convolve the effect of the lenses from each recorded image or frame. Next, super-resolution techniques are used to enhance the images and increase their resolution. Super-resolution allows optical zooming to be performed without any moving parts in the camera. An advantage provided is to minimize the weight of the frame (hence cameras) and the size of the frame (for aesthetic purposes) and the power consumption (to extend use time between recharges).

To de-convolve the effects of lenses, the following steps are taken. The point spread function of a lens is location dependent. Prior to using a lens, its PSF as function of x, y and z is measured and recorded. From two- or multi-camera arrangements, the location of each object point with respect to the cameras can be accurately determined. Knowing the transfer function of the lens and the detector array, the bandwidth limiting effects (lowered resolution) of these components can be compensated for thereby improving the image quality. In various embodiments, such computations are performed off-line to save battery power. In one implementation, the camera may use wireless links to offload its image data to a server. The server performs the processing and makes it available to the user for subsequent viewing. It is also possible that the user downloads the images to a PC and uses software that is provided to undo the effects of the lenses and provide image enhancement.

Focus invariant cameras intentionally blur images at the image plane but through electronic processing provide crisp pictures. In an embodiment, such cameras are used. However, for two reasons it is desired to enhance the images after downloading to a PC or server. First, the battery life can be extended and second, the blurred images are hardly of much value or attention. Hence, this is a good way to provide privacy in case the camera is lost. In various embodiments, the recorded data (images, frames and etc.) may be encrypted. The camera unit is provided with a software key that is stored on user's personal computers or on the server. No one else will be able to access the recorded information. An advantage of this feature is to provide privacy and security for what was viewed.

Embodiments of the EVR provide optical zoom, pan and tilt without any moving parts. These are referred to as "soft zoom", "soft tilt" and "soft pan." A fisheye lens is used to record a FOV similar to a human eye. A second lens that has a narrow FOV is used and the images from this camera are used to enhance the images recorded by the fisheye lens using super-resolution techniques such as described by Joseph Goodman cited above and by Anil Bharath and Maria Petrou, "Next Generation Artificial Vision Systems," Artech House 2008, ISBN 1-59693-224-4, Chapters 5, 6 and 7. Increasing the resolution of the fisheye images by a factor of four is the same as achieving 4× optical resolution but without losing the FOV by the same factor. Given this, users are allowed to interactively look at different part of the scene or make the eye viewed frames available to them anywhere within the extended FOV. This is equivalent to pan and tilt and are performed with no mechanical movements.

As an object moves toward or walks away from a person, the focus of the eyes changes to follow the object automatically. In at least one embodiment, because it is known how the human eye works, and how its focus changes by distance, the super-resolution images can be used to adjust the frame size properly to capture a dynamic and human like image or video. This results in a dynamic magnification as opposed to a fixed value provided by a lens of typical low cost point-and-shoot cameras.

Another embodiment is directed to stereo recording or 3D recording where identical cameras are used on either side of the frame. The state of art and current practice is to place a color filter array (CFA) such as RGB (Red Green Blue) mosaic pattern in front of the CMOS or CCD to extract the color information of the scene. The most widely used pattern is RGB Bayer pattern, which is suitable for "high light" environments. At least one embodiments uses this pattern on one side. There is another mosaic pattern that is suitable for low-light environments. This pattern in a 4×4 matrix that is written by rows as GMGM, CYCY, MGMG, CYCY where C=Cyan, M=Magenta, Y=Yellow and G=Green. More optical transmission in the latter case will result in less noise in lower light condition. With this configuration of two cameras, better overall images under different lighting conditions are obtained.

In another embodiment, a two camera configuration for High Dynamic Range (HDR) imaging is used. In this case, one camera is used as the main camera and the other as the auxiliary. The auxiliary camera takes several pictures at shutter speeds different from the main camera. These additional pictures are used to enhance the main image (in case of taking still images) or the main frame (in the case of recording video). The images from the auxiliary camera are used to adjust the dynamic range in each portion of the main image. The auxiliary camera does not need to have the same resolution because the intention is to equalize the image or the frame properly. A lower resolution camera can be operated at higher speeds which is what we need to enhance the main picture. One use of the eye-view recorder is to take daily snapshots of what a user does. The pictures may be taken every predetermined number of seconds or minutes but the detail is sharp with this scheme. Standard HDR imaging is defined as taking multiple shuts from the same scene at different shutter speeds. However, this is not always possible because the subject may move or the camera might be moved. In at least one embodiment, a separate camera that can simultaneously capture images is used to address this problem.

Placing CFA in front detectors requires computations to estimate 2 other color values for each measured pixel. This often results in numerical artifacts for certain patterns. To eliminate this effect, in one embodiment, three identical cameras are placed vertically on top of each other instead of a single camera. The lens for the three cameras is smaller than in the single camera case but two goals are achieved: using smaller lenses placed vertically is less distractive than a single larger lens. Each smaller camera has only one single filter. In a single CFA camera, the light is split among three colors after it passes through the lens. The focus of this embodiment is to reduce the size of the lens as much as possible to make the frame look normal. Instead of one large lens, three smaller lenses are used to collect the same amount of light per pixel.

Standard single lens camcorders such as Flip by Pure Digital Technology have a viewing range from one meter to infinity. However, human eyes see distances from 25 cm and farther. By using focus-invariant lenses in at least one embodiment, human like zoom range is achieved with reasonably small lens size to acquire good pictures.

Existing cameras adjust their shutter speeds for the optimum light assuming the subject or the region of interest is static or moves slowly. Because of this effect, when a camera is moved quickly, a sequence of blurred images is seen. The human eyes do not suffer from a similar problem because images are continuously received through the eyes from a wide FOV. In one embodiment, an accelerometer is placed on the camera (eyeglasses frame in this case) to detect movements of the camera due to head movements. Detectors that can operate at high frame rates, 250 fps and more, are used. The frame rate (shutter speed) is increased linearly by the head rotation or movement. This allows recording of sharp video frames and provides a smooth and human like transition as video cameras move. Software may be used to convert fixed frame rates to higher rates so that blurring due to video transition is eliminated or minimized. We may also use the movement vector to remove the blur from the image frames using digital signal processing de-blurring techniques.

Human eyes cannot see well in the dark but there are cameras (IR or night vision) that can be used for imaging at dark. In another embodiment, a two-mode camera is used to enable recording at day and night. One camera is normal and it records at day light, and the other camera has infra-red detectors. Infra-red detectors are of many types. For minimal improvement, existing CMOS detectors are used in conjunction with an optical filter that allows only the IR light to get in and blocks white light (blue, green and red). Other IR detectors have much better quantum efficiencies at IR than CMOS detectors. By using such detectors, better night images are obtained. In one embodiment, one side of the camera has day vision and another has night vision. In an alternative embodiment, a single night vision camera is provided for the whole array to provide extra capabilities for the eye-view recorder.

It is possible to separate the optical lenses from the imaging detector by employing a length of fiber imaging devices such as those manufactured by Schott. Such fiber currently can achieve a resolution of 50 LP/mm. An advantage of using this scheme is to consume much less or no electrical power in the frame area. In another embodiment, the eyeglasses are made totally passive by using such imaging fibers to monitor the user's eye for eye tracking purposes. At the electronic box or later during signal processing, de-convolving the effect of the imaging fibers is performed before producing the final images. Such a resolution is sufficient for VGA and HD video. Using an imaging fiber to couple the light from a lens to a detector is applicable to various embodiments. In effect, every claim and configuration above can be restated when imaging fiber is used between the lens and the detector. Just like lenses, imaging fibers have different numerical apertures (NA). Higher NA fibers can be used with larger FOV lenses.

FIG. 15 illustrates an embodiment of the EVR showing two lenses on the right and left sides of the frame, their associated FOV, and display of left FOV in the orthogonal plane (a circular pattern).

Figure 16:
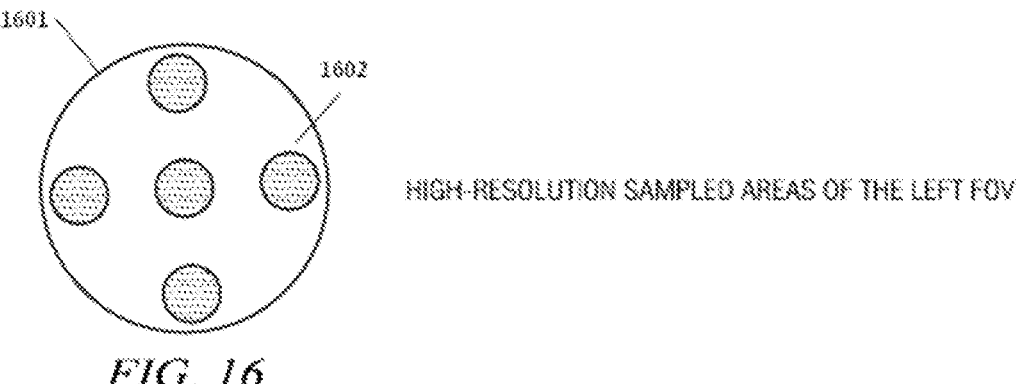
FIG. 16 illustrates an embodiment of the EVR in which one camera takes a wide FOV image and the camera on the other side provide spatial sampling of the wide FOV through a narrower FOV camera.

FIG. 16 illustrates an embodiment of the EVR in which one camera takes a wide FOV image and the camera on the other side provide spatial sampling of the wide FOV through a narrower FOV camera. In this new instance, multi-cameras are used to sample various portions of the wider FOV. An example is shown in FIG. 16 in which five high resolution and narrow FOV are used to spatially sample the wide FOV.

The previous embodiment provides a configuration to achieve geometrical optical super-resolution to enhance the recorded images by each camera. It is desired to try to minimize the used space within the camera frame to make it as normal looking as possible. There are large commercially available CMOS and CCD detectors but there is not enough space to accommodate such pieces in the frame. As a result, Optical Super-Resolution (OSR) techniques are resorted to. To achieve a geometrical resolution N times smaller than resolution achieved by the detector pixel size, OSR techniques such as described in Zeev Zalevsky, David Mendlovic, "Optical Superresolution," Springer 2004, ISBN 0387-00591-9 are used.

Figure 17:
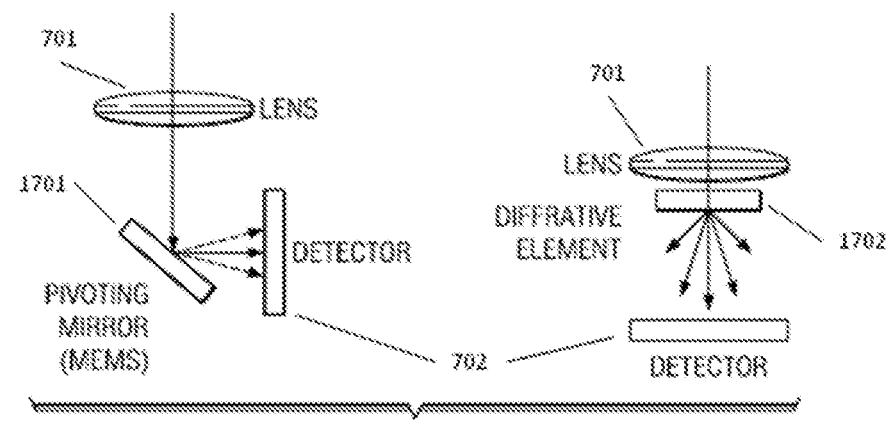
FIG. 17 illustrates an embodiment in which a microelectromechanical systems (MEMS) mirror is utilized to steer a beam across a detector surface in two dimensions.

A standard ¼ inch detector is used in many commercial cameras. These have a typical FOV of 45 degrees. In various embodiments, it is desired to extend this FOV by a factor of 2 to 5. With no compensation, extending FOV for the same detector results in lowering the image resolution. Human FOV is about 200 degrees. In one configuration, to achieve a 4× resolution improvement, the image is moved across the detector 4 times per frame in steps of a quarter (¼) of the pixel size of the detector array. A configuration to achieve this type of OSR is shown in FIG. 17. In FIG. 17, an embodiment is illustrated in which a microelectromechanical systems (MEMS) mirror is utilized to steer the beam across the detector surface in two dimensions. The image is two dimensional, hence steering in two orthogonal directions is needed. An advantage of this technique is that all pixels of the image are enhanced simultaneously.

An embodiment of another OSR implementation is to place a diffractive optical element (such as a wire mesh) right after the lens and in between the lens and the detector. This configuration achieves high resolution at the expense of reducing FOV For example, a 4× improvement in resolution requires a 4× reduction in the FOV viewed by the lens. It is possible to select various diffraction orders to zoom into different portions of the FOV or to send each diffraction order to a different detector for OSR.

Figure 18:
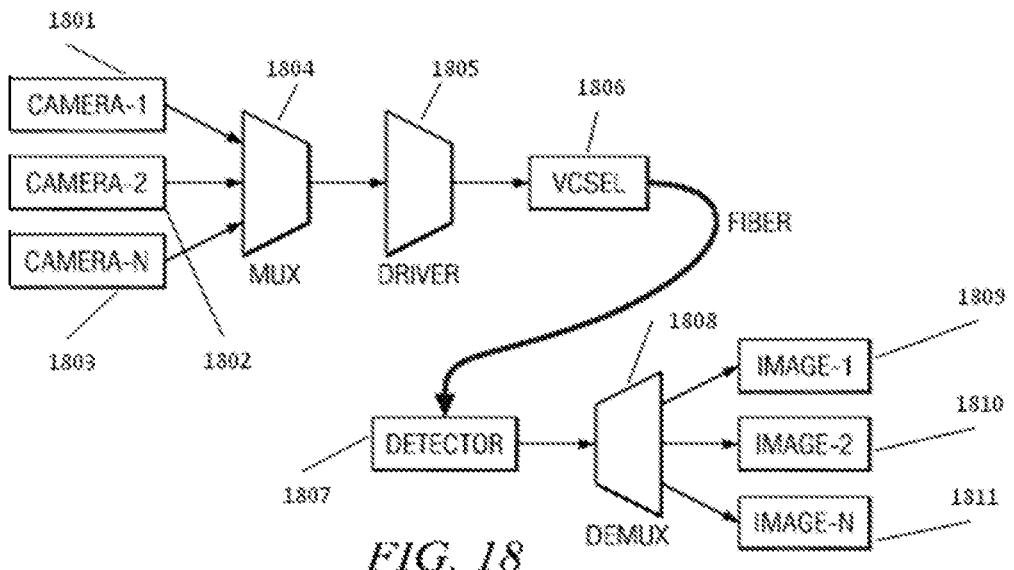
FIG. 18 illustrates a schematic diagram of an embodiment in which camera outputs are transmitted from the eyeglasses frame to the electronic box via a fiber.

As it is desired to increase the FOV and at the same time keep resolution of the captured images, we need to increase the number of monitored pixels per second. This effectively means we will need a bigger pipe to transmit the recorded pixel values from the frame to the electronics box. Using wires make the frame heavier. To address this issue, in at least one embodiment optical fibers are used to send the signal outputs down to the electronic box. The transmitter source is an LED (Light Emitting Diode) or a VCSEL (Vertically Coupled Surface Emitting Laser). Such components are extremely small in size, consume low power and have very high reliability rates. In addition, a driver may be integrated with the source to further reduce the space and power consumption. State of art power consumption for a driver and a VSCEL at 10 GB/s is about 15 mW. A metal coated fiber may be used for electrical power deliver to the frame. A schematic diagram of such an embodiment shown in FIG. 18 in which camera outputs are transmitted from the eyeglasses frame to the electronic box via a fiber. In the embodiment of FIG. 18, Camera-I to Camera-N send signals to a multiplexer. The multiplexer provides the multiplexed signal to a VCSEL which is coupled to a detector via a fiber. The VCSEL sends the multiplexed signal to the detector over the fiber, and the detector provides the multiplexed signal to a demultiplexer. The demultiplexed signals are provided as Image-1 to Image-N.

In this embodiment, there are at least two kinds of camera modules that can be used. Some already have serial output data and others provide parallel data output. Using parallel output data requires more wires to connect the send the data to the electronic box. One option is to use a serializer per camera module. There are integrated circuits that have multi-serializers per chip. Some camera modules such as those made by Aptina (Micron) have serial outputs. Furthermore, these modules can accept a serial output from another camera module and interleave the output of the two modules in one serial stream. In various embodiments, such camera modules may be used to interleave (multiplex) the output of the outside looking camera and an eye tracking camera.

In still another embodiment, additional cameras are placed on the side of the temples to achieve a total FOV around 270 degrees which is much larger than what human eyes can achieve. These additional cameras are always looking sideways. This is useful for virtual reality applications or interactive revisit of a scene or an experience.

It will be appreciated by those skilled in the art having the benefit of this disclosure that this METHOD AND APPARATUS FOR AN IMAGING DEVICE provides a video recorded that is integrated with eyeglass to record a scene that is being viewed by a user. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. An image recording apparatus comprising:
a first camera module configured to have a first field of view and generate first image data that is reproducible as a first image within the first field of view and having a first resolution;
a second camera module configured to have a second field of view and generate second image data that is reproducible as a second image within the second field of view and having a second resolution;
the first camera module and the second camera module disposed on or in a common support and spaced from each other by a predetermined distance such that the first field of view and the second field of view share an overlapping field of view;
the first camera module and the second camera module configured such that the first image data and the second image data are generated at the same time or at about the same time when the first camera and the second camera are directed at a scene such that the first image and the second image are of the scene and include a same portion of the scene within the overlapping field of view such that stereo imaging of the scene in the overlapping field of view is provided; and
at least one processor configured to:
receive at least a portion of the first image data from the first camera and at least a portion of the second image data from the second camera;
process the at least a portion of the first image data and the at least a portion of the second image data using at least one common feature associated with (i) the at least a portion of the first image data and (ii) the at least a portion of the second image data, to generate distance information regarding distance to a subject in the same portion of the scene included in the first image and the second image; and
process the at least a portion of the second image data and the distance information to generate for display to a user an output image by:
determining a region of interest in the second image and a peripheral region in the second image using the distance information such that the region of interest in the second image comprises the subject and is at least partially enclosed by the peripheral region in the second image;
using the peripheral region in the second image for a peripheral region in the output image by lowering the second resolution of the peripheral region in the second image to provide the peripheral region in the output image, wherein the peripheral region in the output image has a peripheral region resolution lower than the second resolution such that the peripheral region in the output image appears to the user as an unfocused periphery of the output image when the output image is displayed to the user; and
using the region of interest in the second image for a region of interest in the output image, wherein the region of interest in the output image has a region of interest resolution higher than the peripheral region resolution of the peripheral region in the output image such that the region of interest in the output image appears to the user as a focused region of the output image when the output image is displayed to the user.

2. The image recording apparatus of claim 1, wherein:
the second field of view is narrower than the first field of view;
the second resolution is higher than the first resolution; and
the peripheral region resolution is lower than the first resolution.

3. The image recording apparatus of claim 2, wherein the region of interest resolution has the second resolution.

4. The image recording apparatus of claim 3, wherein:
the second field of view is entirely within the first field of view such that the second field of view comprises all of the overlapping field of view and the scene within the second field of view comprises all of the same portion of the scene within the overlapping field of view; and
the output image is of the scene only within the second field of view.

5. The image recording apparatus of claim 1, wherein the image recording apparatus is embodied in a mobile phone.

6. The image recording apparatus of claim 1, wherein the common support includes an eyeglass frame.

7. The image recording apparatus of claim 1, further comprising a display unit, wherein the output image is displayed on the display unit.

8. The image recording apparatus of claim 7, further comprising a memory unit, wherein the at least one processor is further configured to save image data reproducible as the output image to the memory unit.

9. The image recording apparatus of claim 1, wherein the subject is a face of a person, and wherein the at least one processor is further configured to execute a facial recognition procedure to identify the face.

10. The image recording apparatus of claim 1, wherein the second resolution of the peripheral region in the second image is reduced to provide the peripheral region in the output image by pixel binning, applying a low pass filter, or a combination thereof.

11. The method of claim 1, wherein the at least one common feature is a plurality of common features.

12. A method for generating a modified image using a multi-camera device having a first camera module and a second camera module, the method comprising:
generating first image data, via the first camera module configured to have a first field of view, the first image data being reproducible as a first image within the first field of view and having a first resolution;
generating second image data, via the second camera module configured to have a second field of view, the second image data being reproducible as a second image within the second field of view and having a second resolution, the first camera module and the second camera module disposed on or in a common support and spaced from each other by a predetermined distance such that the first field of view and the second field of view share an overlapping field of view, the first camera module generating the first image data at the same time or at about the same time that the second camera module generates the second image data when the first camera and the second camera are directed at a scene such that the first image and the second image are of the scene and include a same portion of the scene within the overlapping field of view such that stereo imaging of the scene in the overlapping field of view is provided; and receiving, via a processor, at least a portion of the first image data from the first camera and at least a portion of the second image data from the second camera;

processing, via the processor, the at least a portion of the first image data and the at least a portion of the second image data using at least one common feature associated with (i) the at least a portion of the first image data and (ii) the at least a portion of the second image data, to generate distance information regarding distance to a subject in the same portion of the scene included in the first image and the second image; and processing, via the processor, the at least a portion of the second image data and the distance information to generate for display to a user an output image by:

determining a region of interest in the second image and a peripheral region in the second image using the distance information such that the region of interest in the second image comprises the subject and is at least partially enclosed by the peripheral region in the second image;

using the peripheral region in the second image for a peripheral region in the output image by lowering the second resolution of the peripheral region in the second image to provide the peripheral region in the output image, wherein the peripheral region in the output image has a peripheral region resolution lower than the second resolution such that the peripheral region in the output image appears to the user as an unfocused periphery of the output image when the output image is displayed to the user; and using the region of interest in the second image for a region of interest in the output image, wherein the region of interest in the output image has a region of interest resolution higher than the peripheral region resolution of the peripheral region in the output image such that the region of interest in the output image appears to the user as a focused region of the output image when the output image is displayed to the user.

13. The method of claim 12, wherein:

the second field of view is narrower than the first field of view;

the second resolution is higher than the first resolution; and the peripheral region resolution is lower than the first resolution.

14. The method of claim 13, wherein the region of interest resolution has the second resolution.

15. The method of claim 14, wherein:

the second field of view is entirely within the first field of view such that the second field of view comprises all of the overlapping field of view and the scene within the second field of view comprises all of the same portion of the scene within the overlapping field of view; and the output image is of the scene only within the second field of view.

16. The method of claim 12, wherein the common support includes an eyeglass frame.

17. The method of claim 12, wherein the multi-camera device further comprises a display unit, and wherein the method further comprises displaying the output image on the display unit.

18. The method of claim 17, wherein the multi-camera device further comprises a memory unit, and wherein the method further comprises saving image data reproducible as the output image to the memory unit.

19. The method of claim 12, wherein the subject is a face of a person, and wherein the method further comprises executing a facial recognition procedure to identify the face.

20. The method of claim 12, wherein the second resolution of the peripheral region in the second image is reduced to provide the peripheral region in the output image by pixel binning, applying a low pass filter, or a combination thereof.

21. The imaging system of claim 12, wherein the at least one common feature is a plurality of common features.

* * * * *